US012811046B2

(12) United States Patent
Shimomura et al.

(10) Patent No.: US 12,811,046 B2
(45) Date of Patent: Nov. 24, 2026

(54) INDUCTOR

(71) Applicant: Murata Manufacturing Co., Ltd., Kyoto-fu (JP)

(72) Inventors: Yasuo Shimomura, Nagaokakyo (JP); Takeshi Kobayashi, Nagaokakyo (JP); Kenichi Harada, Nagaokakyo (JP); Daisuke Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 649 days.

(21) Appl. No.: 18/453,128

(22) Filed: Aug. 21, 2023

(65) Prior Publication Data

US 2024/0120139 A1 Apr. 11, 2024

(30) Foreign Application Priority Data

Oct. 11, 2022 (JP) ................................ 2022-163192
Oct. 11, 2022 (JP) ................................ 2022-163193
Oct. 11, 2022 (JP) ................................ 2022-163195
Oct. 11, 2022 (JP) ................................ 2022-163196
Oct. 11, 2022 (JP) ................................ 2022-163201
Oct. 11, 2022 (JP) ................................ 2022-163202

(51) Int. Cl.
*H01F 27/29* (2006.01)
*H01F 17/00* (2006.01)
*H01F 17/04* (2006.01)

(52) U.S. Cl.
CPC ....... *H01F 17/0006* (2013.01); *H01F 27/292* (2013.01); *H01F 2017/048* (2013.01)

(58) Field of Classification Search
CPC ............... H01F 17/0006; H01F 27/292; H01F 2017/048; H01F 17/04; H01F 27/255; H01F 27/2823; H01F 27/2852; H01F 27/29
See application file for complete search history.

(56) References Cited

U.S. PATENT DOCUMENTS

2002/0050909 A1* 5/2002 Jinno ..................... H01C 7/102 338/21
2017/0133143 A1* 5/2017 Maeda ................ H01F 41/0246
2018/0277296 A1* 9/2018 Endo ..................... H01F 41/046
2019/0180911 A1 6/2019 Yang et al.
(Continued)

FOREIGN PATENT DOCUMENTS

JP 2007-028777 A 2/2007
JP 2014-175531 A 9/2014
(Continued)

*Primary Examiner* — Mang Tin Bik Lian
(74) *Attorney, Agent, or Firm* — Studebaker Brackett PLLC

(57) ABSTRACT

An inductor including an element body containing metal magnetic powder and resin and having a coil conductor that has a winding portion, an extended portion extended from the winding portion, and an outer electrode connection portion leading to the extended portion and connected to an outer electrode and is embedded in the element body; and an element body coat covering a surface of the element body. The outer electrode is formed on a surface of the element body and connected to the outer electrode connection portion, in which the outer electrode connection portion has a region covered with the element body coat and a region connected to the outer electrode on the surface of the element body.

15 Claims, 16 Drawing Sheets

(56) References Cited

U.S. PATENT DOCUMENTS

| | | | | |
|---|---|---|---|---|
| 2020/0098506 | A1* | 3/2020 | Hamada | H01F 27/32 |
| 2020/0265993 | A1* | 8/2020 | Kitashima | H01F 17/04 |
| 2020/0335265 | A1* | 10/2020 | Tomizuka | H01F 41/041 |
| 2021/0313106 | A1* | 10/2021 | Noumi | H01F 27/292 |

FOREIGN PATENT DOCUMENTS

| | | | |
|---|---|---|---|
| JP | 3198412 | U | 7/2015 |
| JP | 2015-144166 | A | 8/2015 |
| JP | 2016-058495 | A | 4/2016 |
| JP | 2016-092422 | A | 5/2016 |
| JP | 2018-107346 | A | 7/2018 |
| JP | 2020-178042 | A | 10/2020 |
| JP | 2020-191364 | A | 11/2020 |
| JP | 2021-027269 | A | 2/2021 |
| JP | 2022-500864 | A | 1/2022 |
| JP | 2022-060974 | A | 4/2022 |
| JP | 2022-062984 | A | 4/2022 |
| WO | 2017/135058 | A1 | 8/2017 |
| WO | 2020/179298 | A1 | 9/2020 |

* cited by examiner

INDUCTOR

CROSS-REFERENCE TO RELATED APPLICATIONS

This application claims benefit of priority to Japanese Patent Application No. 2022-163192 filed Oct. 11, 2022, Japanese Patent Application No. 2022-163193 filed Oct. 11, 2022, Japanese Patent Application No. 2022-163195 filed Oct. 11, 2022, Japanese Patent Application No. 2022-163196 filed Oct. 11, 2022, Japanese Patent Application No. 2022-163201 filed Oct. 11, 2022 and Japanese Patent Application No. 2022-163202 filed Oct. 11, 2022, the entire content of each are incorporated herein by reference.

BACKGROUND

Technical Field

The present disclosure relates to an inductor.

Background Art

International Publication No. 2017/135058 discloses an inductor in which a coil conductor is embedded in an element body made of a composite material of a resin material and metal powder, and the element body is coated with an insulating film. In this inductor, an outer electrode connected to an end portion of the coil conductor exposed from the element body is formed by plating on a portion in which the insulating film is removed by laser irradiation.

In the inductor described above, the end portion of the coil conductor exposed from the element body may be peeled off from the element body before the outer electrode is formed by plating. For this reason, there is room for improvement in the stability of the connection between the end portion of the coil conductor and the outer electrode.

SUMMARY

An aspect of the present disclosure is an inductor including an element body containing metal magnetic powder and resin and having a coil conductor embedded therein, an element body coat covering a surface of the element body, and an outer electrode formed on the surface of the element body. The coil conductor has a winding portion, an extended portion extended from the winding portion, and an outer electrode connection portion leading to the extended portion and connected to the outer electrode, and the outer electrode connection portion has a region covered with the element body coat and a region connected to the outer electrode on the surface of the element body.

According to the present disclosure, since the element body coat prevents the outer electrode connection portion from being peeled off from the surface of the element body, it is possible to improve the stability of the connection between the coil conductor and the outer electrode.

DETAILED DESCRIPTION

Hereinafter, embodiments of the present disclosure will be described with reference to the drawings.

Inductor Overall Configuration

Figure 1:
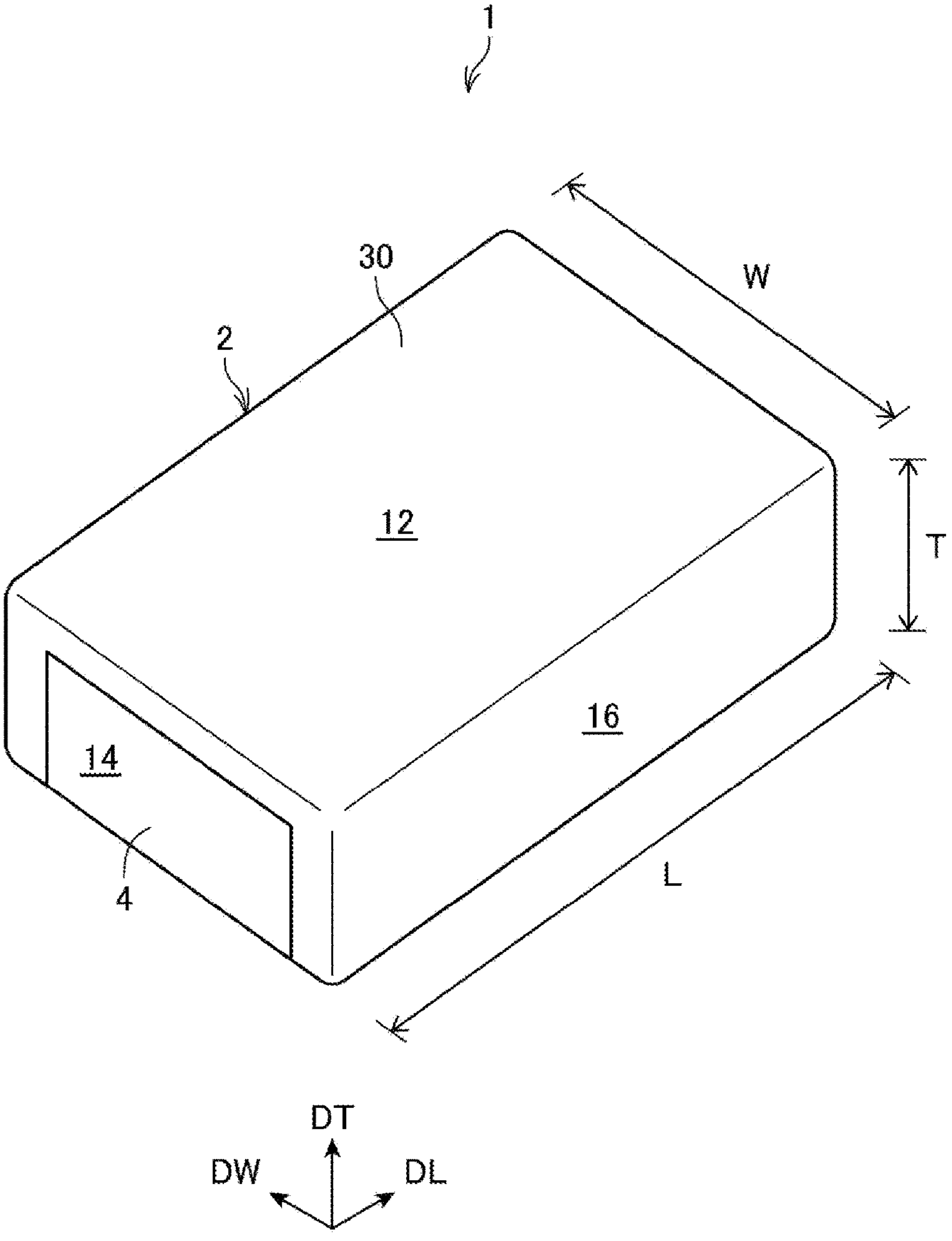
FIG. 1 is a perspective view of an inductor according to an embodiment of the present disclosure viewed from an upper surface side.
Figure 2:
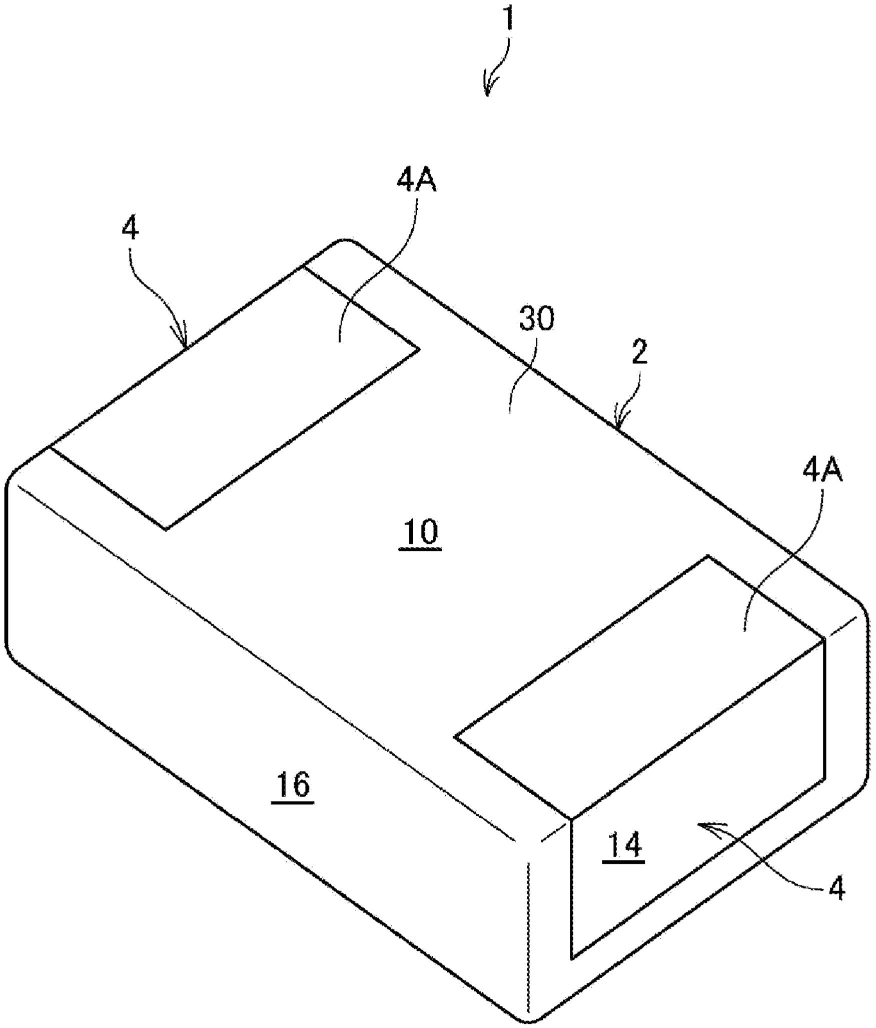
FIG. 2 is a perspective view of the inductor viewed from a bottom surface side.

FIG. 1 is a perspective view of an inductor 1 according to the present embodiment viewed from an upper surface 12 side, and FIG. 2 is a perspective view of the inductor 1 viewed from a bottom surface 10 side.

The inductor 1 of the present embodiment is configured as a surface-mount electronic component, and includes an element body 2 having a substantially rectangular parallelepiped shape, which is an aspect of a substantially hexahedral shape, and a pair of outer electrodes 4 provided on a surface of the element body 2.

Hereinafter, in the element body 2, a first main surface facing a mounting substrate (not illustrated) at the time of mounting is defined as the bottom surface 10, a second main surface facing the bottom surface 10 is referred to as the upper surface 12, a pair of third main surfaces orthogonal to the bottom surface 10 are referred to as end surfaces 14, and a pair of fourth main surfaces orthogonal to the bottom surface 10 and the pair of end surfaces 14 are referred to as side surfaces 16.

As illustrated in FIG. 1, a distance from the bottom surface 10 to the upper surface 12 is defined as a thickness T of the element body 2, a distance between the pair of side surfaces 16 is defined as a width W of the element body 2, and a distance between the pair of end surfaces 14 is defined as a length L of the element body 2. In addition, a direction of the thickness T is defined as a thickness direction DT, a direction of the width W is defined as a width direction DW, and a direction of the length L is defined as a length direction DL.

A nominal size of the finished inductor 1 is, for example, 1.4 mm in length L dimension, 1.2 mm in width W dimension, and 0.8 mm in thickness T dimension.

Hereinafter, a plane along the DL direction and the DT direction (a plane orthogonal to the DW direction) is referred to as an LT plane, a plane along the DT direction and the DW direction (a plane orthogonal to the DL direction) is referred to as a TW plane, and a plane along the DL direction and the DW direction (a plane orthogonal to the DT direction) is referred to as an LW plane. In addition, cross sections of the inductor 1 taken along the LT plane, the TW plane, and the LW plane are referred to as an LT cross section, a TW cross section, and an LW cross section, respectively.

Figure 3:
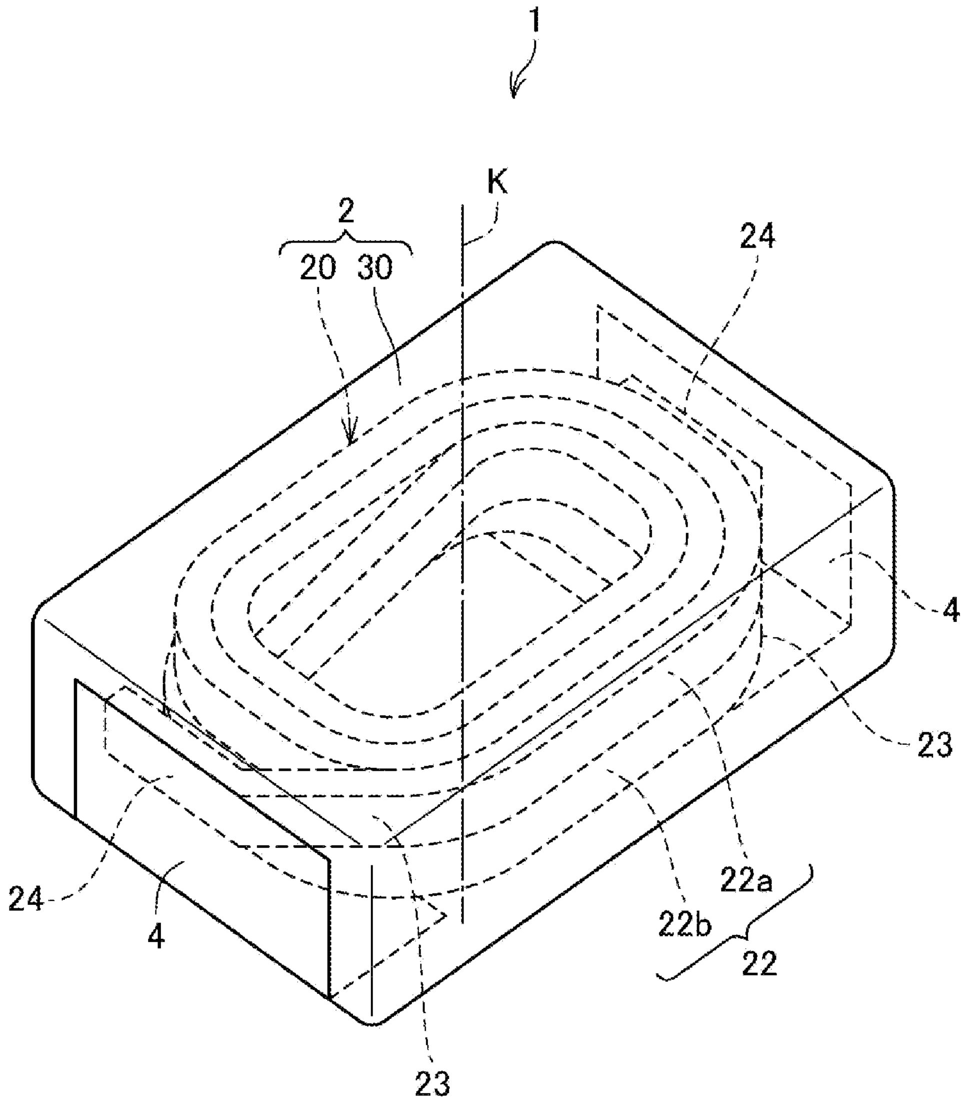
FIG. 3 is a perspective view illustrating an internal configuration of the inductor.

FIG. 3 is a perspective view illustrating an internal configuration of the inductor 1.

The element body 2 includes a coil conductor 20 and a substantially hexahedral core 30 in which the coil conductor 20 is embedded, and is configured as a molded inductor in which the coil conductor 20 is sealed in the core 30.

The core 30 is a molded body that is compression-molded into a substantially hexahedral shape by pressurizing and heating mixed powder obtained by mixing magnetic particles and resin in a state in which the coil conductor 20 is included.

In addition, the magnetic particles of the present embodiment are formed of a soft magnetic material and include particles having two types of particle sizes, that is, first magnetic particles that are large particles having a relatively large average particle diameter and second magnetic particles that are small particles having a relatively small average particle diameter. As a result, at the time of compression molding, the second magnetic particles that are small particles enter between the first magnetic particles that are large particles together with the resin, and thus it is possible to increase the filling rate of the magnetic particles in the core 30 and also to increase the magnetic permeability.

In the present embodiment, the average particle diameter of the metal particles of the first magnetic particles is equal to or more than 20 μm and equal to or less than 28 μm (i.e., from 20 μm to 28 μm), and the average particle diameter of the metal particles of the second magnetic particles is equal to or more than 1 μm and equal to or less than 6 μm (i.e., from 1 μm to 6 μm). Note that the average particle diameter of the first magnetic particles is preferably equal to or more than 20 μm and equal to or less than 22 μm (i.e., from 20 μm to 22 μm), and the average particle diameter of the second magnetic particles is preferably equal to or more than 1.5 μm and equal to or less than 1.8 μm (i.e., from 1.5 μm to 1.8 μm). In addition, the magnetic particles may include particles having three or more particle sizes by including particles having an average particle diameter different from that of the first magnetic particles and the second magnetic particles.

Both of the first magnetic particles and the second magnetic particles are particles including metal particles, an oxide film covering surfaces of the metal particles, and an insulating film covering a surface of the oxide film. When the metal particles are covered with the oxide film and the insulating film, insulation resistance and withstand voltage are increased.

In the first magnetic particles of the present embodiment, an Fe—Si—B amorphous alloy powder is used as the metal particles. The oxide film of the first magnetic particles is composed of two layers of a SiO layer and a $Fe_2SiO_4$ layer, and the thickness of the entire oxide film is equal to or more than 20 nm and equal to or less than 155 nm (i.e., from 20 nm to 155 nm). In addition, the insulating film of the first magnetic particles is formed of phosphate glass having a thickness of equal to or more than 10 nm and equal to or less than 100 nm (i.e., from 10 nm to 100 nm).

In addition, in the second magnetic particles of the present embodiment, carbonyl iron powder is used as the metal particles. The oxide film of the second magnetic particles is iron oxide formed by surface-oxidizing carbonyl iron powder that is a metal particle. In addition, the insulating film of the second magnetic particles is a sol-gel reaction product containing silica as a component. Accordingly, slipperiness of the surface of the second magnetic particles can be increased, and the second magnetic particles can easily enter between the first magnetic particles in an element body molding and curing process of the element body 2 described below. As a result, the relative magnetic permeability of the core 30 can be further increased by further increasing the density of the magnetic material in the core 30.

Note that in the first magnetic particles, an Fe—Si—Cr alloy powder, an Fe—Ni—Al alloy powder, an Fe—Cr—Al alloy powder, an Fe—Si—Al alloy powder, an Fe—Ni alloy powder, or an Fe—Ni—Mo alloy powder may be used as the metal particles.

In addition, in the first magnetic particles, phosphoric acid, zinc phosphate, manganese phosphate, glass, or resin may be used for the insulating film.

The resin material contained in the mixed powder of the present embodiment contains a bisphenol A-type epoxy resin and a rubber-modified epoxy resin. Thus, it is possible to manufacture the inductor 1 in which both the strength and the toughness of the element body 2 are improved.

In the present embodiment, in the magnetic powder contained in the mixed powder, the first magnetic particles are equal to or more than 70 wt % and equal to or less than 85 wt % (i.e., from 70 wt % to 85 wt %) and the second magnetic particles are equal to or more than 15 wt % and equal to or less than 30 wt % (i.e., from 15 wt % to 30 wt %) based on the total weight of the magnetic particles contained in the mixed powder. In addition, the resin contained in the mixed powder is equal to or more than 2.0 wt % and equal to or less than 3.5 wt % (i.e., from 2.0 wt % to 3.5 wt %) based on the total weight of the magnetic powder and the resin. Note that the first magnetic particles are preferably equal to or more than 70 wt % and equal to or less than 80 wt % (i.e., from 70 wt % to 80 wt %), and the second magnetic particles are preferably equal to or more than 20 wt % and equal to or less than 30 wt % (i.e., from 20 wt % to 30 wt %). In addition, the resin is preferably equal to or more than 2.7 wt % and equal to or less than 30 wt % (i.e., from 2.7 wt % to 30 wt %).

As illustrated in FIG. 3, the coil conductor 20 includes a winding portion 22 in which a conductive wire is spirally wound around a winding axis K in two upper and lower stages along the winding axis K such that both ends of the conductive wire are located on an outer periphery and are connected to each other on an inner periphery, a pair of extended portions 23 extended from the winding portion 22, and a pair of outer electrode connection portions 24 that are conductive wire portions leading to the extended portions 23, respectively, for connection to an outer electrode described later. The winding portion 22 includes two winding regions **22*a* and 22*b* that overlap along the winding axis K. The conductive wires in the winding regions 22*a* and 22*b*** are connected to each other at a part of the inner periphery thereof.

The winding portion 22 has, for example, a substantially rectangular shape in plan view viewed from a direction of the winding axis K. The coil conductor 20 is embedded in the element body 2 such that the winding axis K extends along the thickness direction DT of the element body 2 and such that, in plan view seen from the direction of the winding axis K, each side of the winding portion 22 having a substantially rectangular shape in plan view extends along (e.g., parallel to) each side of the element body 2 having a substantially rectangular shape in plan view.

The conductive wire constituting the coil conductor 20 includes a conductor and a coating layer formed on a surface of the conductor. The conductive wire is a rectangular wire having a rectangular cross section, and the conductor is a belt-like conductor made of copper and having a rectangular cross section. The conductor has a thickness of equal to or more than 60 μm and equal to or less than 100 μm (i.e., from 60 μm to 100 μm), and a width of equal to or more than 160 μm and equal to or less than 200 μm (i.e., from 160 μm to 200 μm). The coating layer includes an insulating layer formed on a surface of the belt-like conductive wire and a fusion layer formed on a surface of the insulating layer for bonding the belt-like conductive wires overlapping each other in the winding portion 22. The insulating layer is made of, for example, a polyimide amide resin and has a thickness of 3 μm. In addition, the fusion layer is made of, for example, a polyamide resin and has a thickness of equal to or more than 1 μm and equal to or less than 25 μm (i.e., from 1 μm to 25 μm).

The extended portion 23 is extended from the winding portion 22 and is electrically connected to the outer electrode 4 via the outer electrode connection portion 24 that is extended and exposed to each of the pair of end surfaces 14.

Each of the pair of outer electrodes 4 is a so-called L-shaped electrode constituted by an L-shaped member extending from each of the end surfaces 14 of the element body 2 to the bottom surface 10. The outer electrodes 4 are respectively connected to the outer electrode connection portions 24 of the coil conductor 20 on the end surfaces 14, and portions 4A (FIG. 2) extending to the bottom surface 10 are electrically connected to wiring of a circuit substrate by appropriate mounting means such as solder.

In addition, an element body protective layer (not illustrated) is formed on the surface of the element body 2 except for a range of the outer electrode 4. The element body protective layer is, for example, resin obtained by adding a phenoxy resin to a novolac resin, and contains nano silica as a filler. The element body protective layer is formed on the surface of the element body 2 with a thickness of equal to or more than 10 μm and equal to or less than 30 μm (i.e., from 10 μm to 30 μm). Note that the thickness of the element body protective layer is preferably equal to or more than 10 μm and equal to or less than 20 μm (i.e., from 10 μm to 20 μm), and more preferably equal to or less than 15 μm.

The inductor 1 having such a configuration is used as an electronic component of an electric circuit in which a large current flows, a choke coil of a DC-DC converter circuit or a power supply circuit, or an electronic component of an electronic device such as a personal computer, a DVD player, a digital camera, a TV, a cellular phone, a smartphone, car electronics, or a medical/industrial machine because the inductor 1 can improve DC superposition characteristics by using a soft magnetic material for the magnetic particles. However, the application of the inductor 1 is not limited thereto, and the inductor 1 may be used in, for example, a tuning circuit, a filter circuit, a rectifying and smoothing circuit, or the like.

Outline of Inductor Manufacturing Process

Figure 4:
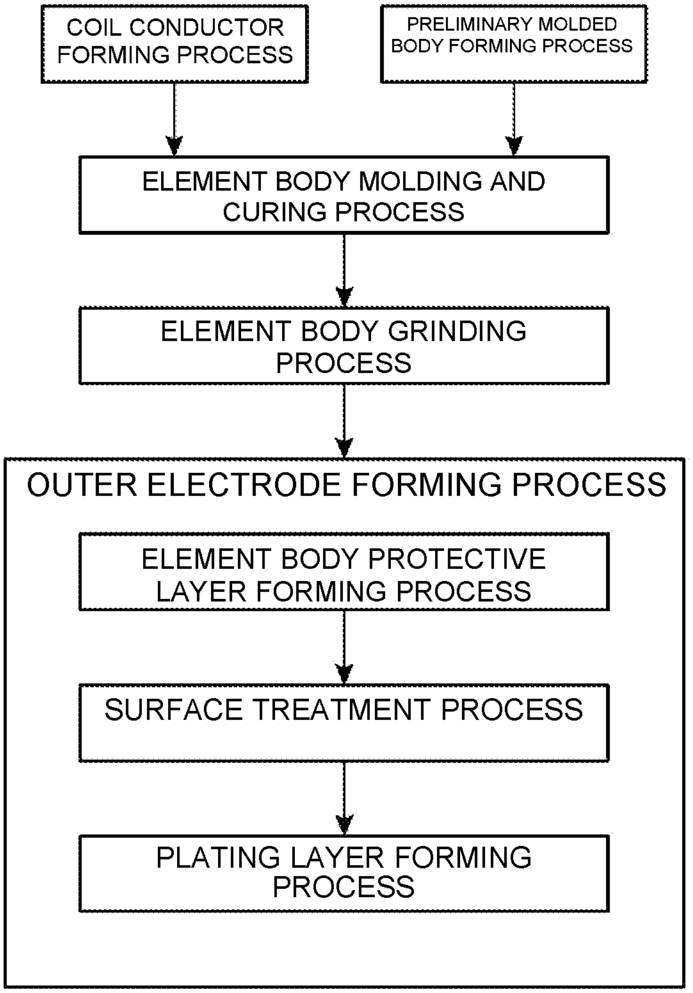
FIG. 4 is a schematic view of a manufacturing process of the inductor.

FIG. 4 is a schematic view of a manufacturing process of the inductor 1.

As illustrated in the above drawing, the manufacturing process of the inductor 1 includes a coil conductor forming process, a preliminary molded body forming process, the element body molding and curing process, an element body grinding process, and an outer electrode forming process.

The coil conductor forming process is a process of forming the coil conductor 20 from a conductive wire. In this process, the coil conductor 20 is formed into a shape having the winding portion 22, the extended portion 23, and the outer electrode connection portion 24 described above by winding the conductive wire in a winding method called "alpha winding". The alpha winding refers to a state in which a conductive wire functioning as a conductor is spirally wound in two stages such that the extended portions 23 at the winding start and the winding end are located on the outer periphery. The number of turns of the coil conductor 20 is not particularly limited.

The preliminary molded body forming process is a process of forming a preliminary molded body called a tablet.

The preliminary molded body is formed into a solid shape that is easy to handle by pressing the mixed powder that is the material of the element body 2, and in the present embodiment, two types of tablets are formed: a first tablet having an appropriate shape (for example, an E shape) having a groove into which the coil conductor 20 is inserted; and a second tablet having an appropriate shape (for example, an I shape or a plate shape) that covers the groove of the first tablet.

In the element body molding and curing process, the first tablet, the coil conductor, and the second tablet are set in a molding die, pressed in the overlapping direction of the first tablet and the second tablet while applying heat, and cured, thereby integrating the first tablet, the coil conductor, and the second tablet. Thus, the element body 2 in which the coil conductor 20 is included in the core 30 is formed.

In the element body grinding process, abrasive grains are caused to act on a side surface of the molded body obtained in the element body molding and curing process, thereby shaving off (i.e., grinding) the side surface until the width W becomes a predetermined width. By this process, the element body 2 in which the width W of the molded body is downsized to a predetermined width is obtained. Since a distance (also referred to as a side gap) between the coil conductor 20 in the element body 2 and the side surface of the element body 2 is reduced by this downsizing, the occupancy ratio of the coil in a radial direction of the winding portion 22 of the coil conductor 20 is increased. In addition, since the element body 2 is obtained by grinding the molded body obtained by the compression molding to a predetermined size, it is possible to reduce dimensional variation of the element body 2 as compared with a case where the element body 2 is controlled to a predetermined size only by the compression molding. In the element body grinding process, polishing (for example, barrel polishing) may be performed to chamfer corners caused by grinding of the side surfaces of the element body 2.

The outer electrode forming process is a process of forming the outer electrode 4 on the element body 2, and includes an element body protective layer forming process, a surface treatment process, and a plating layer forming process.

The element body protective layer forming process is a process of coating the entire surface of the element body 2 with an insulating resin.

The surface treatment process is a process of modifying a surface of a predetermined electrode portion by irradiating the predetermined electrode portion on a surface of the core 30 with a laser beam. Here, the predetermined electrode portion refers to a range of the surface of the core 30 where the outer electrode 4 is to be formed, and includes a portion where the outer electrode connection portion 24 is exposed. Specifically, the laser beam is applied thereby to remove the element body protective layer on the surface of the element body 2 and the coating layer of the outer electrode connection portion 24 of the coil conductor 20, remove the resin on the surface of the core 30, and remove the insulating film on the surfaces of the magnetic particles exposed from the core 30 in the range of the predetermined electrode portion. As a result, an exposed area of the metal of the magnetic particles per unit area of the surface of the core 30 is larger in the predetermined electrode portion of the surface of the core 30 than in the other surface portions of the core 30. Note that after the irradiation of the laser beam, a cleaning treatment (for example, an etching treatment) may be performed to clean the surface of the predetermined electrode portion.

In the plating layer forming process, copper is barrel-plated on the surface of the core 30 thereby to form a copper plating layer on the predetermined electrode portion irradiated with the laser beam. In addition to this, the plating layer may be formed by further providing a Ni plating layer and a Sn plating layer on the copper plating layer.

Hereinafter, details of the inductor 1 according to the present embodiment will be further described.

A. Coil Conductor

Figure 5:
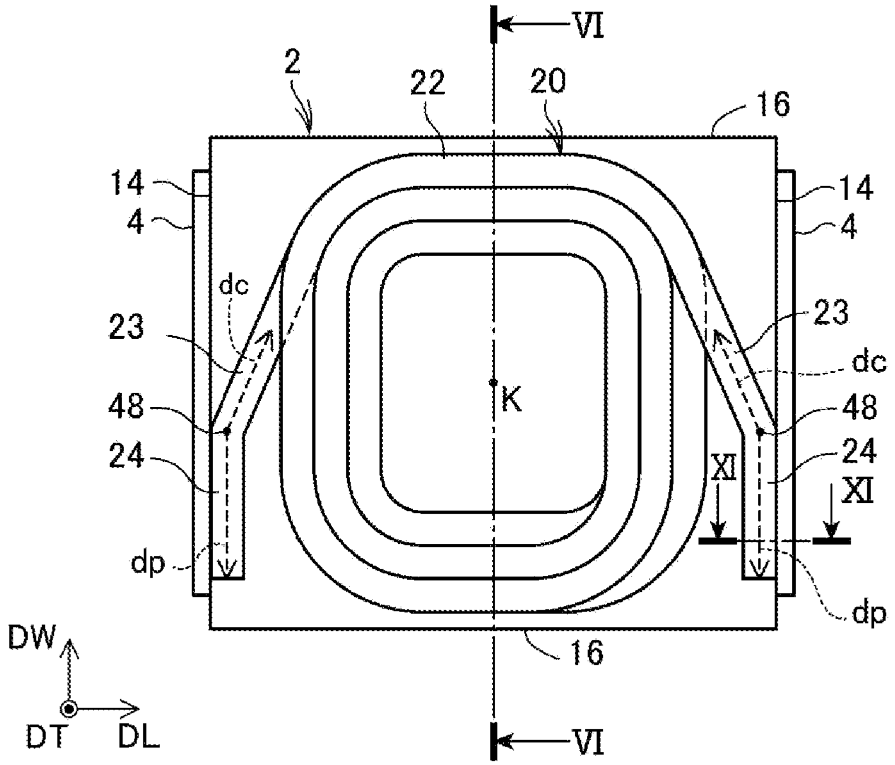
FIG. 5 is a plan view illustrating the internal configuration of the inductor.
Figure 6:
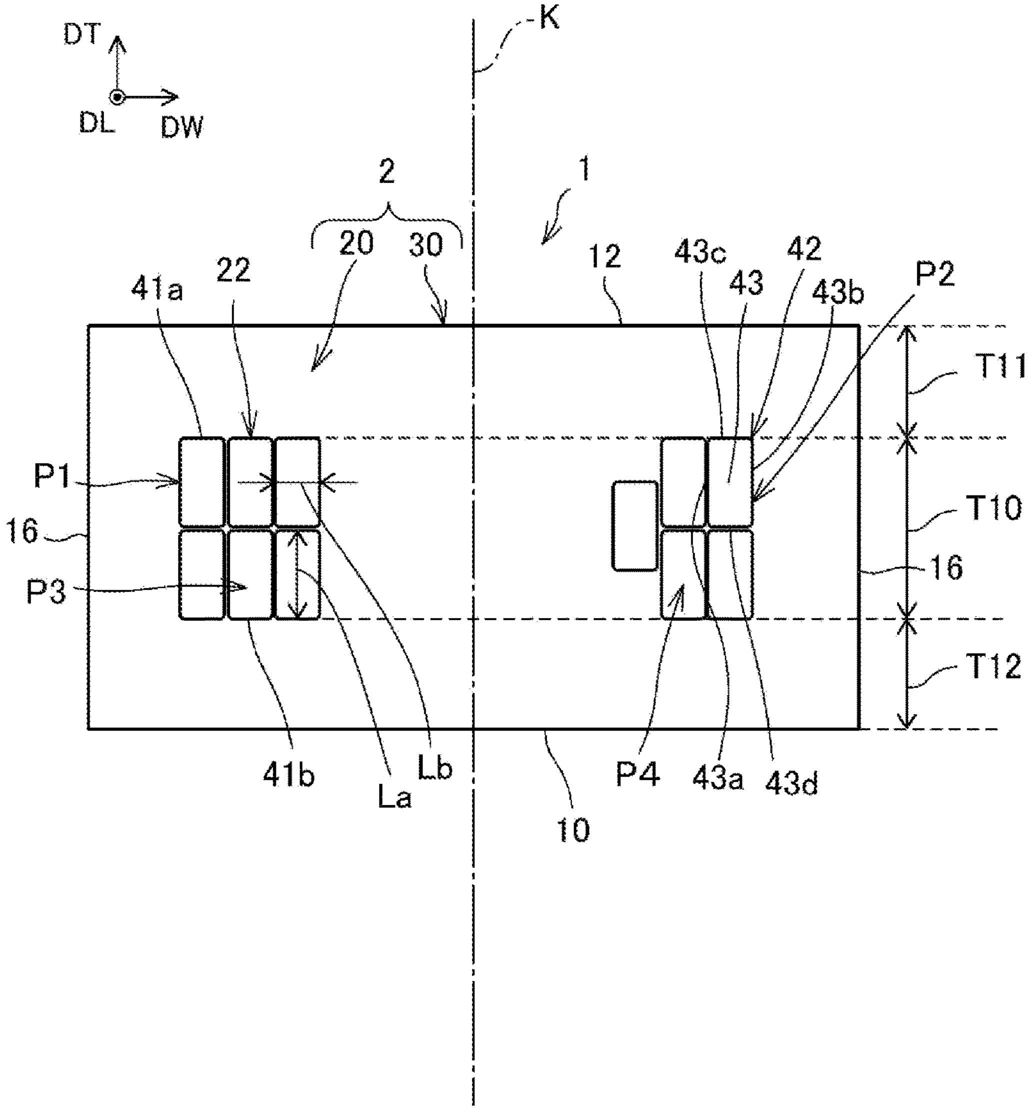
FIG. 6 is a cross-sectional view taken along line VI-VI of FIG. 5.

FIG. 5 is a plan view illustrating the internal configuration of the inductor 1. FIG. 6 is a cross-sectional view taken along line VI-VI of FIG. 5. FIG. 6 illustrates a TW cross section of the inductor 1.

First, the coil conductor 20 used in the inductor 1 will be described. As described above, the coil conductor 20 includes the winding portion 22 around which the conductive wire is wound, the pair of extended portions 23, and the pair of outer electrode connection portions 24.

A left end of the winding portion 22 is extended from the lower stage of the winding portion 22 wound in two upper and lower stages, and is connected to a left side of the outer electrode connection portion 24 via the extended portion 23 on the left side. The left side of the outer electrode connection portion 24 is bent in the width direction DW at a bent portion 48 at the tip of the left side of the extended portion 23 and extends linearly in the width direction DW. A right end of the winding portion 22 is extended from the upper stage of the winding portion 22 wound in two upper and lower stages, and is connected to a right side of the outer electrode connection portion 24 via the extended portion 23 on the right side. The right side of the outer electrode connection portion 24 is bent in the width direction DW at the bent portion 48 at the tip of the right side of the extended portion 23 and extends linearly in the width direction DW. In other words, each of the left and right extended portions 23 extends in an extending direction dc that is inclined toward one side in the width direction DW as it extends outward in the length direction DL. In addition, each of the left and right outer electrode connection portions 24 extends in an extending direction dp extending from the other side in the width direction DW to the one side in the width direction DW. Note that in FIG. 5, the portion of the extended portion 23 that is inclined to the one side in the width direction DW toward the outer side in the length direction DL is linear, but at least a part thereof may be formed in a curved shape. In addition, in FIG. 5, the portion of the outer electrode connection portion 24 extending from the other side in the width direction DW to the one side in the width direction DW is linear, but at least a part thereof may be formed in a curved shape.

As illustrated in FIG. 6, a conductive wire 42 constituting the coil conductor 20 includes a conductor 43 that is a wire rod and a coating layer (the coating layer is not illustrated in FIG. 6 and FIG. 7) that covers the conductor 43. The coil conductor 20 is formed by alpha-winding the conductive wire 42. The coil conductor 20 is embedded in the core 30 containing magnetic particles and resin.

A-1. Conductive Wire

Figure 7:
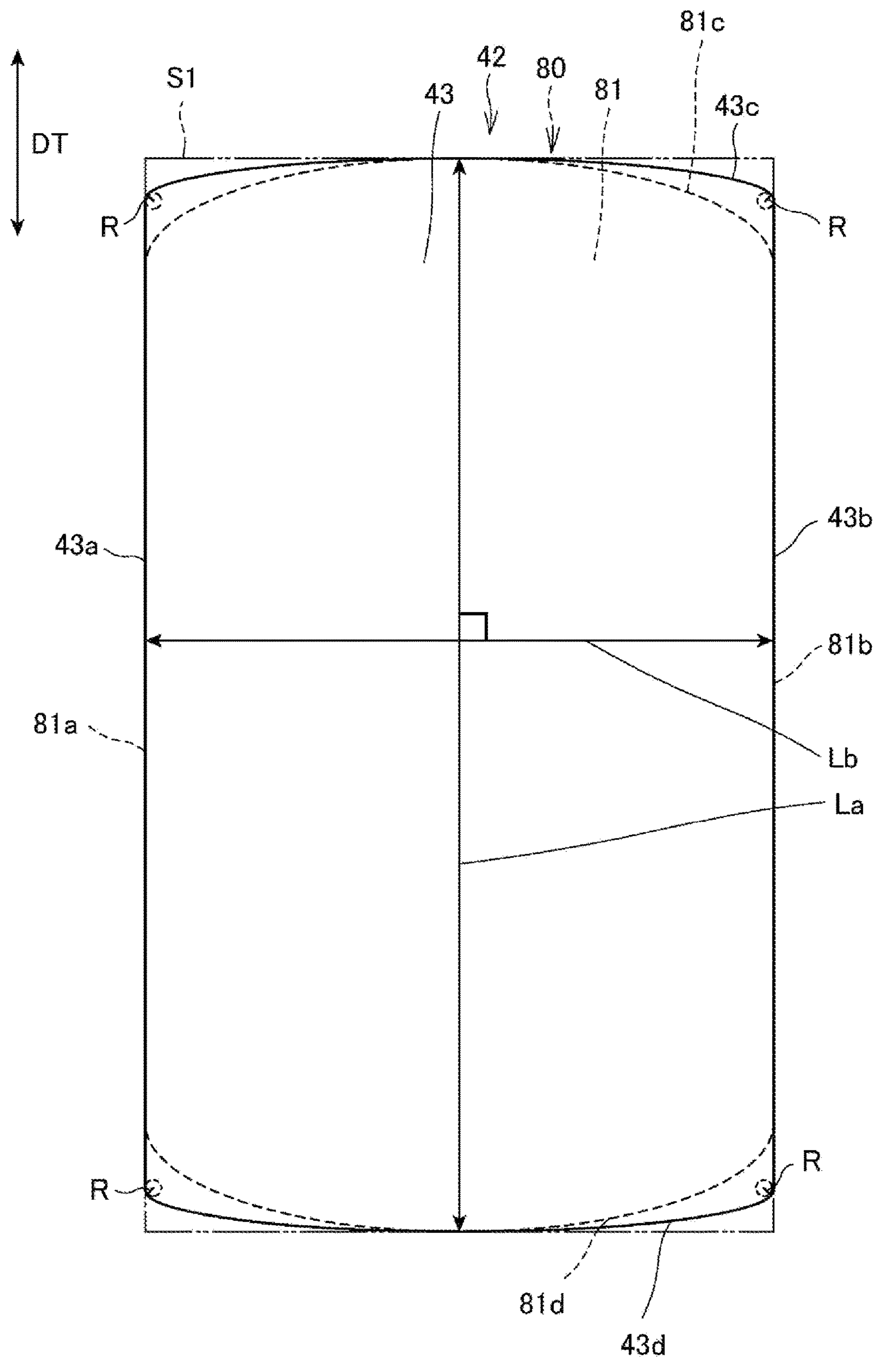
FIG. 7 is a conductor cross-sectional view of a conductor constituting a conductive wire.

FIG. 7 is a conductor cross-sectional view of the conductor 43 constituting the conductive wire 42. FIG. 7 illustrates a cross section orthogonal to the extending direction of the conductor 43.

The conductor 43 is formed to have a rectangular shape with four right-angled corners in the conductor cross section orthogonal to the extending direction. Here, in this specification, the terms "right angle", "rectangle", and "the same" do not necessarily mean "right angle", "rectangle", and "the same" in a strict sense, respectively, and may be substantially "right angle", "rectangle", and "the same". That is, in this specification, the terms "right angle", "rectangle", and "the same" may be used to mean that substantially "right angle", "rectangle", and "the same" include "approximately right angle", "approximately rectangle", and "approximately the same", respectively.

The conductor 43 has a conductor inner peripheral surface 43*a* on the winding axis K side, a conductor outer peripheral surface 43*b* on the side separated from the winding axis K, and a pair of conductor side surfaces 43*c* and 43*d* connecting both ends of the conductor inner peripheral surface 43*a* and both ends of the conductor outer peripheral surface 43*b*. The conductive wire 42 is formed by forming a coating layer on a surface of the conductor 43.

The maximum length between the conductor side surfaces 43*c* and 43*d* in the thickness direction DT of the conductor 43 is defined as a line width La. In addition, the maximum length between the conductor inner peripheral surface 43*a* and the conductor outer peripheral surface 43*b* of the conductor 43 in a direction orthogonal to the thickness direction DT is defined as a line thickness Lb.

Specifically, an angle formed by the conductor inner peripheral surface 43*a* and the conductor side surface 43*c* is a right angle. In addition, an angle formed by the conductor inner peripheral surface 43*a* and the conductor side surface 43*d* is a right angle. Further, an angle formed by the conductor outer peripheral surface 43*b* and the conductor side surface 43*c* is a right angle. In addition, an angle formed by the conductor outer peripheral surface 43*b* and the conductor side surface 43*d* is a right angle. In the present embodiment, the reference of the right angle is that the right-angled corner portion is a corner formed with a roundness having a curvature radius R of equal to or less than 4.5 μm at a portion where the conductor inner peripheral surface 43*a* or the conductor outer peripheral surface 43*b* and the conductor side surface 43*c* or 43*d* forming the right angle intersect. It can be confirmed that the four corners of the conductor are right angles by observing the four corner portions in the cross section of the conductor with a digital microscope and measuring the radius of curvature of each corner portion using a measuring function of the digital microscope.

Here, a virtual circumscribed rectangle S1 is set so as to circumscribe the conductor 43 in the conductor cross section. The circumscribed rectangle S1 is set so that the ratio of an area occupied by the conductor 43 to an area of the circumscribed rectangle S1 is maximized. The conductor cross section is a cutting plane obtained by vertically cutting the conductive wire 42, when remaining as it is, in a direction orthogonal to the length direction DL of the conductive wire 42, and in this cutting plane, a boundary between the coating layer and a conductor 41 is observed to set the circumscribed rectangle S1. That is, in this cutting plane, the circumscribed rectangle S1 is set such that the circumscribed rectangle S1 has room for the line width La between the conductor side surfaces 43*c* and 43*d* of the conductor 43 in the thickness direction DT, and the line thickness Lb between the conductor inner peripheral surface 43*a* and the conductor outer peripheral surface 43*b* of the conductor 43 in a direction orthogonal to the thickness direction DT. In addition, when the determination is made using the inductor 1 as a product, the circumscribed rectangle S1 is set by observing the conductor cross section per turn of the winding portion 22 in a cutting plane (cutting plane illustrated in FIG. 6) vertically cut along a virtual line extending in the width direction DW of the element body 2 passing through the winding axis K of the winding portion 22 when the element body 2 is viewed from the upper surface. In the present embodiment, the average area ratio of the conductor 43 to the circumscribed rectangle S1 per turn of the winding portion 22 is equal to or more than 95%. The term "per turn" means an average value in one turn, and means an average value of the area ratios in two conductor cross sections in one turn in the element body cross section. Therefore, for example, in FIG. 6, the average value of the area ratios at winding positions P1 and P2 may be taken. In addition, for example, in FIG. 6, the average value of the area ratios at winding positions P3 and P4 may be taken.

Here, as indicated by broken lines in FIG. 7, since a normal conductor 81 is formed by crushing the conductor having a circular cross section, a conductor inner peripheral surface 81*a* and a conductor outer peripheral surface 81*b* are formed in flat shapes, while conductor side surfaces 81*c* and 81*d* are formed in curved shapes and have large curvatures. For this reason, in the normal conductor 81, the area ratio with respect to the circumscribed rectangle S1 is likely to be small. On the other hand, since the conductor 43 of the present embodiment is formed by casting so as to intentionally have a rectangular shape with four right angled corners, the curvatures of the curved shapes of the conductor side surfaces 43*c* and 43*d* are small as compared with the normal conductor 81, and the conductor 43 is linearly formed to have a rectangular shape more approximate to the circumscribed rectangle S1.

As illustrated in FIG. 6, in the thickness direction DT in the present embodiment, the coil conductor 20 is embedded inside the core 30 such that an upper surface thickness T11, which is a length from the upper surface 12 of the element body 2 to an upper surface 41*a* of the winding portion 22, is equal to a bottom surface thickness T12, which is a length from a bottom surface 41*b* of the winding portion 22 to the bottom surface 10 of the element body 2.

In the present embodiment, since the conductor 43 has a rectangular shape, the line width La can be made smaller than that of the normal conductor 81 by an area of the corner portion of the conductor 43 when compared at the same DC resistance value (that is, an area of the conductor cross section is the same). As such, since the DC resistance value can be ensured while decreasing a height (thickness) of the coil conductor 20 in the thickness direction DT, when the sizes of the element body 2 are substantially the same, the upper surface thickness T11 and the bottom surface thickness T12 can be easily increased, and the total value T11+T12 of the upper surface thickness T11 and the bottom surface thickness T12 can be increased.

In the present embodiment, in the thickness direction DT as a direction along the winding axis K, a winding portion thickness T10, which is a length from the upper surface 41*a* to the bottom surface 41*b* of the winding portion 22, is equal to the total value T11+T12 of the upper surface thickness T11 and the bottom surface thickness T12. Alternatively, the winding portion thickness T10 may be equal to or less than the total value T11+T12. To be specific, the ratio of the winding portion thickness T10 with respect to the height of the element body 2 is equal to or less than 55%.

This makes it easy to increase the total value T11+T12 of the upper surface thickness T11 and the bottom surface thickness T12 with respect to the winding portion thickness T10, therefore, even when the position of the winding portion 22 is displaced in a vertical direction in manufacturing, a distance between the winding portion 22 and the upper and lower surfaces of the element body 2 can be maintained, and variation in a DC superimposed rated current of the inductor 1 can be suppressed. Here, when a current flows through the inductor, magnetic saturation of the magnetic body occurs and the inductance decreases. The DC superimposed rated current is obtained by defining a lower limit current value that is usable for the inductance with respect to initial characteristics with no current superimposed.

Note that in the present embodiment, the coil conductor 20 is embedded inside the core 30 such that the upper surface thickness T11 and the bottom surface thickness T12 are the same. However, the coil conductor 20 may be embedded inside the core 30 such that the upper surface thickness T11 is larger than the bottom surface thickness T12. Alternatively, the coil conductor 20 may be embedded inside the core 30 such that the bottom surface thickness T12 is larger than the upper surface thickness T11. When one of the upper surface thickness T11 and the bottom surface thickness T12 is larger, the smaller thickness is set so as not to be smaller than ⅙ of the total value T11+T12 of the upper surface thickness T11 and the bottom surface thickness T12.

A-2. Coil Conductor

A-2-1. Configuration of Winding Portion

As described above, the size of the inductor 1 is as small as 1.4 mm in the length L dimension, 1.2 mm in the width W dimension, and 0.8 mm in the thickness T dimension. For this reason, the shape of the winding portion 22 embedded in the core 30 in the element body 2 can greatly affect the value of inductance that can be realized in the inductor 1.

Figure 8A:
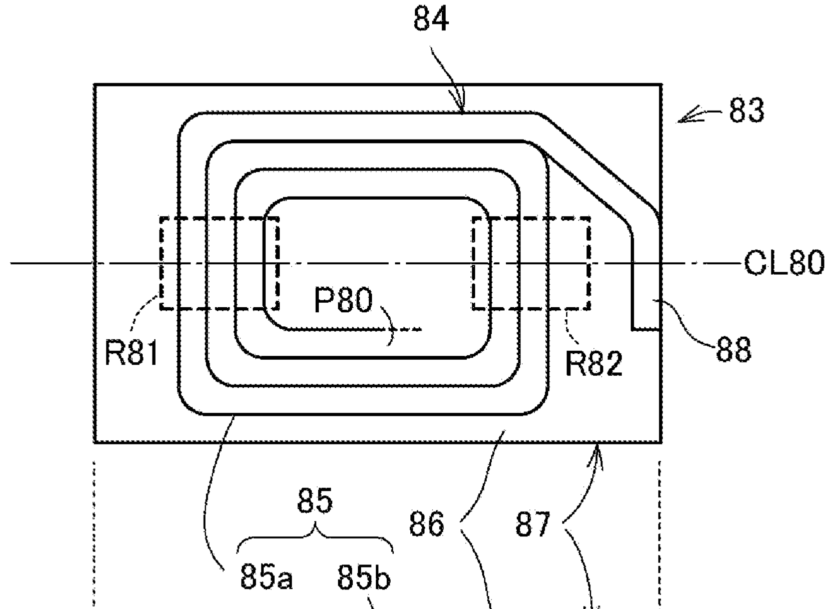
FIGS. 8A-8C include diagrams illustrating a configuration of a winding portion in an inductor in which a winding portion of a coil conductor is wound in a normal winding manner.
Figure 8B:
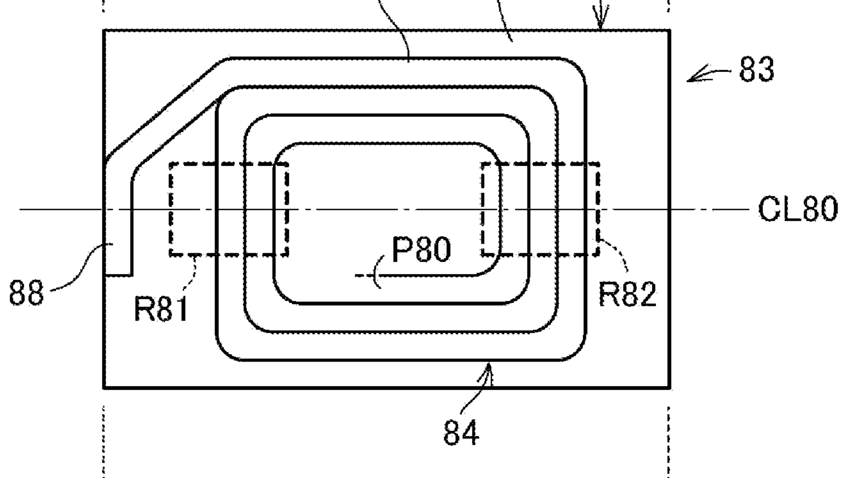
Figure 8C:
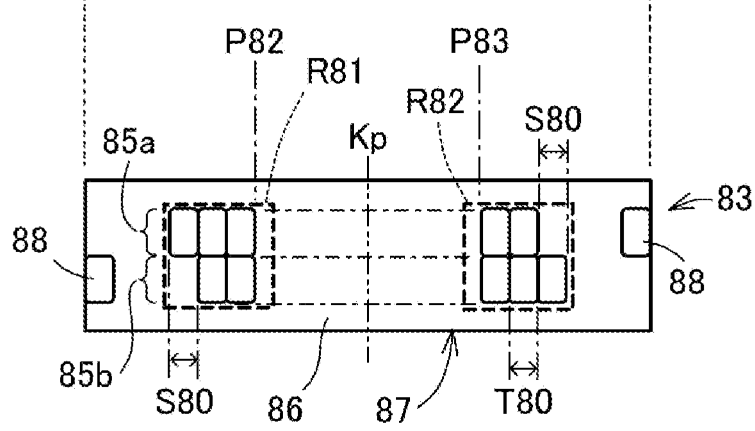

FIGS. 8A-8C include diagrams for explaining a configuration of a winding portion 85 of a coil conductor 84 in an inductor 83 in which the winding portion of the coil conductor is wound in a normal winding manner. FIG. 8A and FIG. 8B each are diagrams of two winding regions 85*a* and 85*b* constituting the winding portion 85 of the inductor 83 having the same configuration as that illustrated in FIG. 1, in which the winding portion of the coil conductor is wound in a normal winding manner, viewed from a direction corresponding to a −DT direction (direction looking down on the upper surface 12) illustrated in FIG. 1. In addition, FIG. 8C is a diagram illustrating a cross section of the inductor 83 corresponding to the LT cross section taken along the center of the width Win FIG. 1 when viewed from a direction corresponding to the DW direction in FIG. 1.

The coil conductor 84 includes the winding portion 85 composed of winding regions 85*a* and 85*b*, an extended portion extended from the winding portion 85, and an outer electrode connection portion 88 that is a conductive wire portion leading to the extended portion for connection to an outer electrode, and constitutes an element body 87 together with a core 86 including magnetic particles in which the coil conductor 84 is embedded. In FIG. 8A, the conductive wire in the winding region 85*a* constituting the winding portion

85 is wound around a winding axis, extended from the outermost periphery of the winding region 85*a* to the right side in the drawing via the extended portion, and leads to the outer electrode connection portion 88 on the right side in the drawing, and in FIG. 8B, the conductive wire in the winding region 85*b* is wound around the winding axis, extended from the outermost periphery of the winding region 85*b* to the left side in the drawing via the extended portion, and leads to the outer electrode connection portion 88 on the left side in the drawing. In addition, the conductive wire in the winding region 85*a* illustrated in FIG. 8B and the conductive wire in the winding region 85*b* illustrated in FIG. 8B are connected to each other at a position P80 on the inner periphery of the winding portion 85.

The total number of turns of the winding portion 85 is an odd integer, for example, 5, rounded to the nearest whole number, and the winding regions 85*a* and 85*b*, which overlap along the winding axis to form the winding portion 85, each have the same number of turns of about 2.5 turns. For this reason, the two winding regions 85*a* and 85*b* have two ranges R81 and R82 in which the numbers of cross sections of the conductive wire included in the two winding regions 85*a* and 85*b* in portions adjacent to each other along a direction of a winding axis Kp are different between one winding region 85*a* and the other winding region 85*b* in a cross section along the direction of the winding axis Kp (a normal direction to the paper surface in FIG. 8A and FIG. 8B) in the portion in which the conductive wire is wound as viewed from an upper surface of the element body 87.

FIG. 8C is a cross-sectional view of the element body 87 taken along a center line CL80 in the width direction of the element body 87 in FIG. 8A and FIG. 8B, and includes cross sections of the ranges R81 and R82. As illustrated in FIG. 8C, in the inductor 83 in which the winding portion of the coil conductor is wound in the normal winding manner, the inner peripheries of the winding region 85*a* and the winding region 85*b* are located at the same positions P82 and P83. The two turns on the inner periphery of each of the winding region 85*a* and the winding region 85*b* are vertically overlapped and located at the same position, while the 0.5 turns located on the outermost periphery are arranged at the outer peripheral positions on the left and right in the drawing, respectively. For this reason, the outer periphery of the winding portion 85 has a step S80 between the winding region 85*a* and the winding region 85*b* on each of the left and right sides in the drawing. The depth of the step S80 can be equivalent to a thickness T80 of the conductive wire measured in a direction orthogonal to the winding axis Kp.

In the core 86 constituting the element body 87, the portion of the step S80 is a dead space and can limit an upper limit value of inductance that can be realized by the inductor 83.

For this reason, in the inductor 1 of the present embodiment, in the portions corresponding to the ranges R81 and R82 illustrated in FIGS. 8A-8C, the inner periphery of one winding region in which the number of cross sections of the conductive wire is small is configured to be shifted to the outer peripheral side with respect to the inner periphery of the other winding region in which the number of cross sections of the conductive wire is large.

FIG. 9 includes diagrams for explaining the configuration of the winding portion 22 of the coil conductor 20 in one embodiment of the inductor 1, and corresponds to FIGS. 8A-8C illustrating the configuration of the inductor 83 in which the winding portion of the coil conductor is wound in the normal winding manner. As described above with reference to FIG. 3, the coil conductor 20 includes the winding portion 22 in which the conductive wire is wound around the winding axis K, the pair of extended portions 23 extended from the winding portion 22, and the pair of outer electrode connection portions 24 that are conductive wire portions connected to the extended portions 23, respectively, for connection to the outer electrodes. In addition, the winding portion 22 includes the two winding regions 22*a* and 22*b* that overlap each other along the winding axis K.

In addition, the conductive wire constituting the coil conductor 20 includes a conductor and a coating layer covering a surface of the conductor. The conductor has a rectangular cross section orthogonal to an extending direction of the conductor, and four apexes of the rectangle are right angles.

Figure 9A:
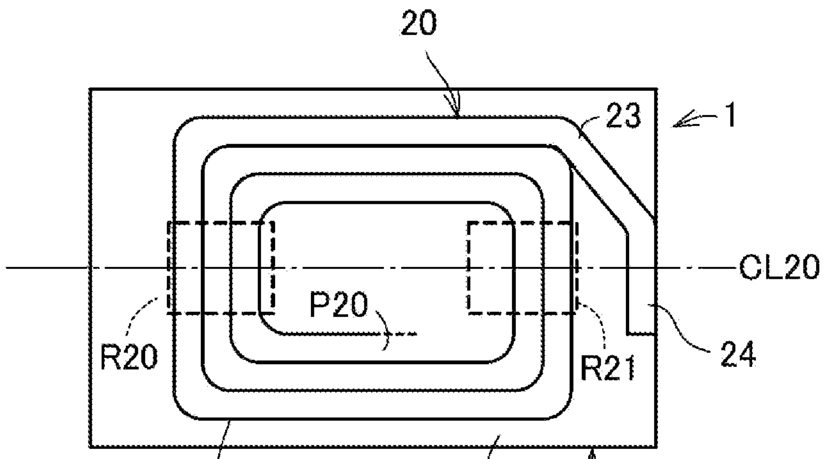
FIGS. 9A-9C include diagrams illustrating a configuration of a winding portion of the inductor according to the present embodiment.
Figure 9B:
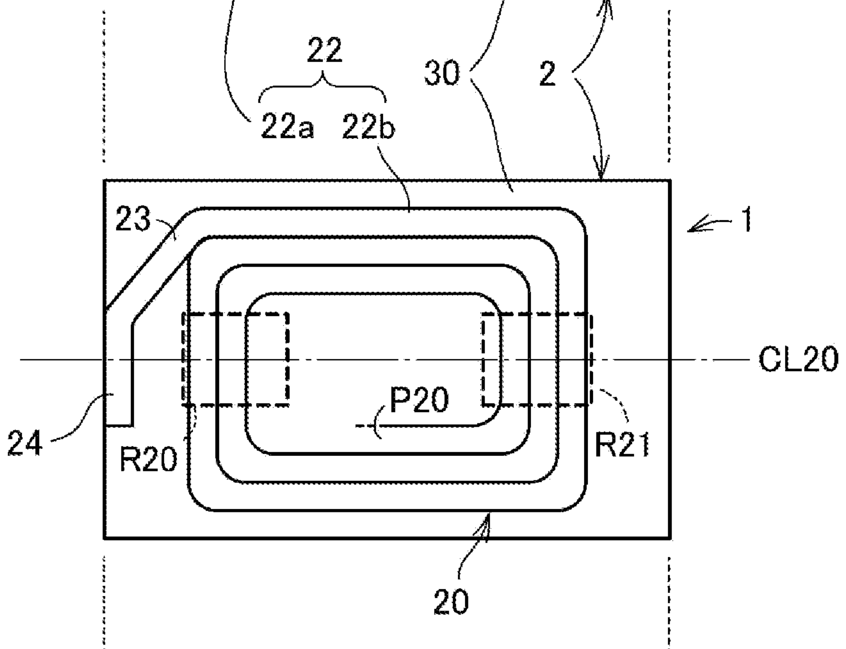
Figure 9C:
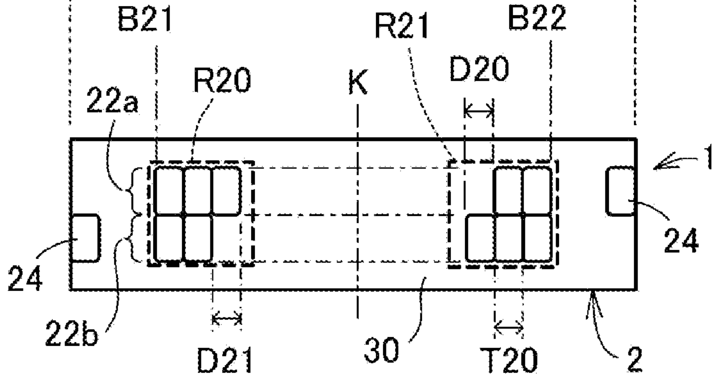

FIGS. 9A and 9B are diagrams when the two winding regions 22*a* and 22*b* constituting the winding portion 22 are each viewed from the –DT direction in FIG. 1 (the direction looking down on the upper surface 12). In addition, FIG. 9C is a diagram when a cross section of the inductor 1 corresponding to the LT cross section taken along a center line CL20 of the width W of the element body 2 (see FIG. 1) is viewed from the DW direction.

In FIG. 9A, the conductive wire in the winding region 22*a* is extended to the right side in the drawing and leads to the outer electrode connection portion 24 on the right side in the drawing via the extended portion 23, and in FIG. 9B, the conductive wire in the winding region 22*b* is extended to the left side in the drawing and leads to the outer electrode connection portion 24 on the left side in the drawing via the extended portion 23. In addition, the conductive wire in the winding region 22*a* illustrated in FIG. 9A and the conductive wire in the winding region 22*b* illustrated in FIG. 9B are connected to each other at a position P20 on the inner periphery of the winding portion 22.

The total number of turns of the winding portion 22 illustrated in FIGS. 9A and 9B is an odd integer, for example, 5, rounded to the nearest whole number. However, this total number of turns is an example for explaining a difference from the inductor 83 illustrated in FIGS. 8A-8C in which the winding portion of the coil conductor is wound in the normal winding manner, and the total number of turns of the winding portion 22 may be set to an arbitrary odd number in accordance with an inductance value required for the inductor 1.

The winding regions 22*a* and 22*b* constituting the winding portion 22 are each formed by the same number of turns of about 2.5 turns. For this reason, the two winding regions 22*a* and 22*b* have two ranges R20 and R21 in which the numbers of cross sections of the conductive wire included in the two winding regions 22*a* and 22*b* adjacent to each other along the direction of the winding axis K in portions adjacent to each other along the direction of the winding axis K are different between one winding region 22*a* and the other winding region 22*b* in the cross section along the direction of the winding axis K (a normal direction to the paper surface in FIG. 9A and FIG. 9B) in the portion in which the conductive wire is wound as viewed from the upper surface 12 of the element body 2.

In the inductor 1, the winding portion 22 has a substantially rectangular shape in plan view viewed from the direction of the winding axis K, and the ranges R20 and R21 are located on two opposing sides of the substantially rectangular shape.

FIG. 9C is a diagram illustrating a cross section of the element body 2 along the center line CL20 of the element body 2 in the width direction in FIGS. 9A and 9B, and includes cross sections of the ranges R20 and R21.

As illustrated in FIG. 9C, the one winding region 22*a* includes a larger number of conductive wires in the one range R20 than in the other winding region 22*b*, and includes a smaller number of conductive wires in the other range R21 than in the other winding region 22*b*. Similarly, the one winding region 22*b* includes a larger number of conductive wires in the one range R21 than in the other winding region 22*a*, and includes a smaller number of conductive wires in the other range R20 than in the other winding region 22*a*.

In the present embodiment, for example, the ranges R20 and R21 are located on two opposing sides of the winding portion 22 parallel to the end surface 14 of the element body 2 as illustrated in FIG. 9A and FIG. 9B so as not to be located in the vicinity of the position P20 on the inner periphery of the winding portion 22 connecting the winding region 22*a* and the winding region 22*b*, and in particular, as illustrated in FIG. 9C, in the ranges R20 and R21, the inner periphery of one winding region having a smaller number of cross sections of the conductive wire in the cross section along the direction of the winding axis K is shifted to an outer peripheral side of the winding portion 22 with respect to the inner periphery of the other winding region having a larger number of cross sections of the conductive wire in the cross section along the direction of the winding axis K.

To be specific, in the range R20, the inner periphery of the winding region 22*b* in which the number of cross sections of the conductive wire in the cross section along the direction of the winding axis K is small is shifted by a distance D21 toward the outer peripheral side of the winding portion 22 with respect to the inner periphery of the winding region 22*a* in which the number of cross sections of the conductive wire in the cross section along the direction of the winding axis K is large. In addition, in the range R21, the inner periphery of the winding region 22*a* in which the number of cross sections of the conductive wire in the cross section along the direction of the winding axis K is small is shifted by a distance D20 toward the outer peripheral side of the winding portion 22 with respect to the inner periphery of the winding region 22*b* in which the number of cross sections of the conductive wire in the cross section along the direction of the winding axis K is large.

In the example of FIG. 9C, the distances D20 and D21 are both equal to a thickness T20 of the conductive wire measured in a direction orthogonal to the winding axis K. Thus, in each of the ranges R20 and R21, a step is not formed between the outer periphery of the winding region 22*a* and the outer periphery of the winding region 22*b*. That is, in each of the ranges R20 and R21, the outer peripheries of the two winding regions 22*a* and 22*b* are formed such that a difference between a distance of one winding region from the winding axis K and a distance of the other winding region from the winding axis K is within ½ of the thickness of the conductive wire, and in FIG. 9C, the distances from the winding axis K are substantially equal to each other.

According to the above-described configuration, in the winding portion 22 of the inductor 1, there is no step S80 at the outer periphery of the winding portion 85 formed in the inductor 83 in which the winding portion of the coil conductor illustrated in FIG. 8C is wound in the normal winding manner. That is, in the inductor 1, since the step S80 as illustrated in FIG. 8C is not provided, the upper limit value of the inductance that can be realized by the inductor 1 can be improved as compared with the inductor 83 in which the winding portion of the coil conductor is wound in the normal winding manner. In addition, in the inductor 1 illustrated in FIGS. 9A-9C, the winding axis having a large magnetic flux density can be formed greatly in each of the winding regions 22*a* and 22*b*.

Note that in the two winding regions 22*a* and 22*b*, the inner periphery of one winding region does not necessarily have to be shifted with respect to the inner periphery of the other winding region in an entire winding direction (the circumferential direction around the winding axis K) of each of the ranges R20 and R21. That is, in the two winding regions 22*a* and 22*b*, in at least a part of each of the ranges R20 and R21 in the winding direction, the inner periphery of one winding region having a smaller number of cross sections of the conductive wire in the cross section along the winding axis K may be shifted toward the outer peripheral side of the winding portion 22 with respect to the inner periphery of the other winding region having a larger number of cross sections of the conductive wire in the cross section along the direction of the winding axis K.

In addition, the shift amount of the inner periphery of one winding region with respect to the inner periphery of the other winding region in the ranges R20 and R21, that is, the distances D20 and D21 in FIG. 9C may be equal to or more than ½ of the thickness T20 of the conductive wire measured in the direction orthogonal to the winding axis K. Also in this case, the size of step between the winding regions 22*a* and 22*b* in an outer peripheral portion of the winding portion 22 is made smaller than the step S80 in the inductor 83 illustrated in FIG. 8C in which the winding portion of the coil conductor is wound in the normal winding manner, so that the upper limit value of the inductance that can be realized by the inductor 1 can be improved as compared with the inductor 83 in which the winding portion of the coil conductor is wound in the normal winding manner.

A-2-2. Configuration of Extended Portion and Outer Electrode Connection Portion

As described above with reference to the related art, in an inductor such as the inductor 1 illustrated in FIG. 1 that includes an element body including a core containing magnetic particles formed of a soft magnetic material and a coil conductor embedded in the core, variations may occur in the position and an exposed area of an extended portion on an end surface of the element body due to the shape of the entire coil conductor, the posture of the coil conductor inside the element body, and the like. Such variations in the position and the exposed area of the extended portion on the end surface of the element body may cause variations in an electrical connection state between the extended portion and the outer electrode and may cause variations in the DC resistance value at a connection portion between the extended portion and the outer electrode.

For this reason, the inductor 1 of the present embodiment is configured such that the shape of the coil conductor 20, in particular, an angle formed by the extended portion 23 extended from the winding portion 22 and the outer electrode connection portion 24 satisfies a predetermined condition in plan view viewed from a normal direction of the upper surface 12 of the element body 2. In addition, the inductor 1 is configured such that the posture of the coil conductor 20 inside the element body 2, in particular, an angle formed by a normal direction of the end surface 14 of the element body 2 on which the outer electrode 4 is formed and the extending direction of the outer electrode connection portion 24 satisfies a predetermined condition in plan view viewed from the normal direction of the upper surface 12 of the element body 2.

Figure 10:
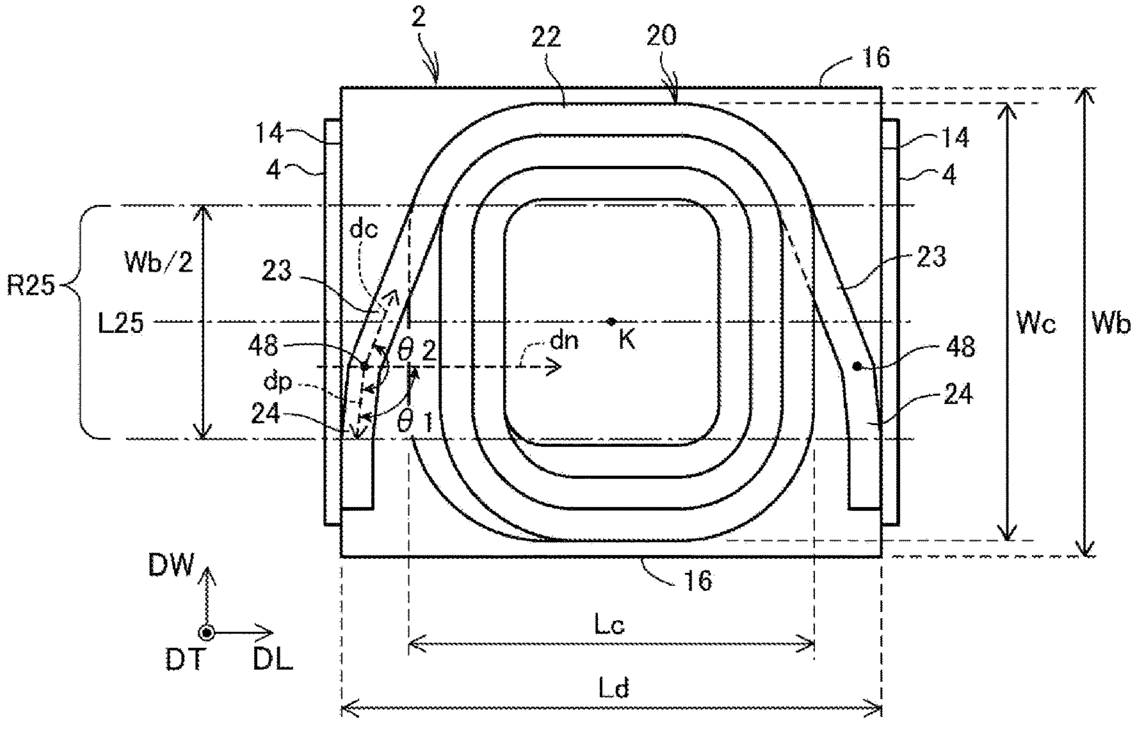
FIG. 10 is a diagram illustrating a configuration of a coil conductor embedded in an element body.

FIG. 10 is a diagram of the coil conductor 20 embedded in the element body 2 in an example of the inductor 1 as viewed from above the upper surface 12 of the element body 2 along the −DT direction. In the inductor 1 illustrated in FIG. 10, as illustrated on the left side in the drawing in the inductor 1, a boundary between the extended portion 23 and the outer electrode connection portion 24 is the bent portion 48 in which the conductive wire is bent, and a first angle θ1 formed by the extending direction dp of the outer electrode connection portion 24 extending from the bent portion 48 as a starting point and a normal direction do of the end surface 14 passing through the bent portion 48 toward the inside of the element body 2 is greater than 90 degrees. When the first angle θ1 is smaller than 90 degrees, the entire outer electrode connection portion 24, from the base to the tip of the outer electrode connection portion 24, is separated from the end surface 14 of the element body 2 toward the inside of the element body, and an exposed area of the outer electrode connection portion 24 exposed from the end surface 14 is reduced. In addition, when the first angle θ1 is 90 degrees, although the exposed area of the outer electrode connection portion 24 exposed from the end surface 14 can be increased, there is a possibility that the outer electrode connection portion 24 is embedded in the element body 2 in a case where the bent portion 48 is displaced in an inward direction of the element body 2. On the other hand, when the first angle θ1 is greater than 90 degrees, a tip side of the outer electrode connection portion 24 extends in a direction protruding from the end surface 14 of the element body 2, and the tip of the outer electrode connection portion 24 extends in a state nearly parallel to the end surface 14 of the element body 2 by being in contact with an inner wall of the molding die in the element body molding and curing process described above, whereby the exposed area of the outer electrode connection portion 24 exposed from the end surface 14 can be increased. Note that the extended portion 23 and the outer electrode connection portion 24 on the right side in the drawing of the inductor 1 are also configured in the same manner as described above, and the first angle θ1 can be defined.

As a result, in the inductor 1, it is possible to reduce variation in the exposed area of the outer electrode connection portion 24 exposed from the end surface 14 and to reduce variation in the DC resistance at a connection portion between the outer electrode connection portion 24 and the outer electrode 4. Here, when the first angle θ1 is greater than 90 degrees on both the left and right sides of the inductor 1 in the drawing, the variation in the exposed area of the outer electrode connection portion 24 exposed from each of the left and right end surfaces 14 in the drawing can be reduced, and the variation in the DC resistance at the connection portion between the outer electrode connection portion 24 and the outer electrode 4 can be reduced.

In addition, the inductor 1 illustrated in FIG. 10, a second angle θ2 formed by the extending direction dc of the extended portion 23 starting from the bent portion 48 and the extending direction dp of the outer electrode connection portion 24 extending from the bent portion 48 is equal to or more than 150 degrees and less than 180 degrees (i.e., from 150 degrees to 180 degrees). As a result, it is possible to further reduce the variation in the exposed area of the outer electrode connection portion 24 exposed from the end surface 14.

From the viewpoint of reducing the variation in the exposed area of the outer electrode connection portion 24, the first angle θ1 is preferably in a range of equal to or less than 100 degrees in addition to being greater than 90 degrees as described above.

Here, in FIG. 10, the coil conductor 20 is embedded in the element body 2 such that the winding axis K is along the normal direction of the upper surface 12 (the normal direction to the paper surface). In addition, in an outer shape of the winding portion 22 in plan view (that is, in plan view illustrated in FIG. 10) viewed from the normal direction of the upper surface 12, a first length Wc that is the maximum length in a direction (for example, the DW direction) orthogonal to the side surface 16 is equal to or greater than a second length Lc that is the maximum length measured in a direction (for example, the DL direction) orthogonal to the end surface 14. The ratio of the first length Wc to the second length Lc may be in a range of equal to or more than 1 and equal to or less than 1.5 (i.e., from 1 to 1.5).

The relationship between the winding portion 22 and the element body 2 is such that the first length Wc of the winding portion 22 is longer than the second length Lc, and a distance Ld between the pair of end surfaces 14 of the element body 2 is longer than a distance Wb between the pair of side surfaces 16. Here, the distance Ld is equal to the length obtained by subtracting the thickness of the outer electrode 4 from the length L of the inductor 1, and the distance Wb is substantially equal to the width W of the inductor 1.

Further, from the viewpoint of reducing the variation in the exposed area of the outer electrode connection portion 24, the bent portion 48 is preferably within a range R25, which is ½ of the distance Wb between the pair of side surfaces 16, of a width in a direction orthogonal to the pair of side surfaces 16 (e.g., the DW direction) with respect to a line L25 as a center that passes through the center of the end surface 14 and is parallel to the side surfaces 16.

The length of the outer electrode connection portion 24 is preferably equal to or more than 30% and equal to or less than 50% (i.e., from 30% to 50%) of the distance Wb between the pair of side surfaces 16 of the end surface 14.

In the element body 2, for example, the distance Wb between the pair of side surfaces 16 is equal to or more than 1.2 mm and equal to or less than 1.4 mm (i.e., from 1.2 mm to 1.4 mm), and the distance Ld between the pair of end surfaces 14 is equal to or more than 1.4 mm and equal to or less than 1.6 mm (i.e., from 1.4 mm to 1.6 mm). Here, the actual size of the inductor 1 may include errors of about several percent with respect to the above-described nominal sizes of the inductor 1, i.e., the length L dimension of 1.4 mm, the width W dimension of 1.2 mm, and the thickness T dimension of 0.8 mm. In addition, it should be noted that the above-described size of the inductor 1 is the size of the entire inductor 1 including the outer electrode 4, the size of the element body 2 is generally smaller than the size of the inductor 1, and the ratio of the distance Wb between the side surfaces 16 to the distance Ld between the end surfaces 14 may be different from the ratio of the width W to the length L in an outer shape of the entire inductor 1.

B. Outer Electrode

Next, a connection configuration between the outer electrode and the outer electrode connection portion 24 of the coil conductor 20 and a configuration of the outer electrode on the element body surface will be described.

Figure 11:
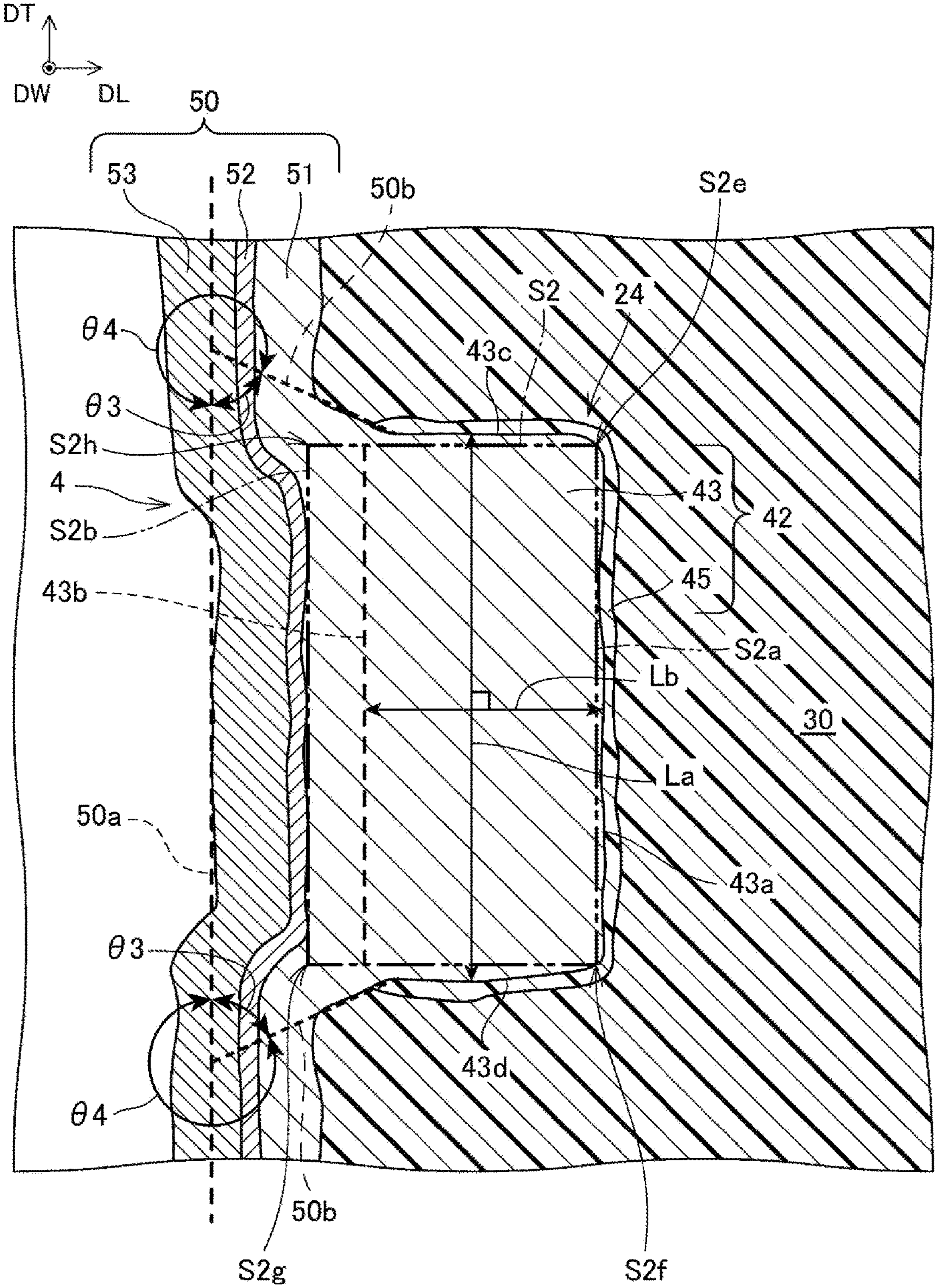
FIG. 11 is a cross-sectional view taken along line XI-XI of FIG. 5.

B-1. Connection Configuration of Outer Electrode and Outer Electrode Connection Portion FIG. 11 is a cross-sectional view taken along line XI-XI of FIG. 5. FIG. 11 illustrates a cross section orthogonal to the extending direction dp of the outer electrode connection portion 24 in the connection portion between the outer electrode connection portion 24 and the outer electrode 4.

The pair of outer electrodes 4 are provided on the surface of the element body 2. The outer electrode 4 is connected to the conductor 43 that is exposed by removing a coating layer 45 of the outer electrode connection portion 24. The outer electrode 4 has a plated conductor 50 formed by plating. The plated conductor 50 of the present embodiment has a copper plating layer 51 as a plating layer having the same metal component as the conductor 43. The copper plating layer 51 is a plating layer for plating the surface of the conductor 43. The copper plating layer 51 and the conductor 43 are connected to each other.

A Ni plating layer 52 is formed on the copper plating layer 51. A Sn plating layer 53 is formed on the Ni plating layer 52. The plated conductor 50 of the present embodiment has the copper plating layer 51, the Ni plating layer 52, and the Sn plating layer 53. The plated conductor 50 is formed on the conductor outer peripheral surface 43*b* of the outer electrode connection portion 24 and the conductor side surfaces 43*c* and 43*d* exposed by removing the coating layer 45 of the conductive wire 42 of the outer electrode connection portion 24. As illustrated in FIG. 11, the amounts of exposure of the conductor side surfaces 43*c* and 43*d* are different between the conductor side surfaces 43*c* and 43*d*. That is, in FIG. 11, the positions of the ends of the coating layer 45 on the outer electrode 4 side are different in the right-left direction between the conductor side surface 43*c* and the conductor side surface 43*d*, and the amount of exposure of the conductor side surface 43*d* is larger than that of the conductor side surface 43*c*.

Figure 12:
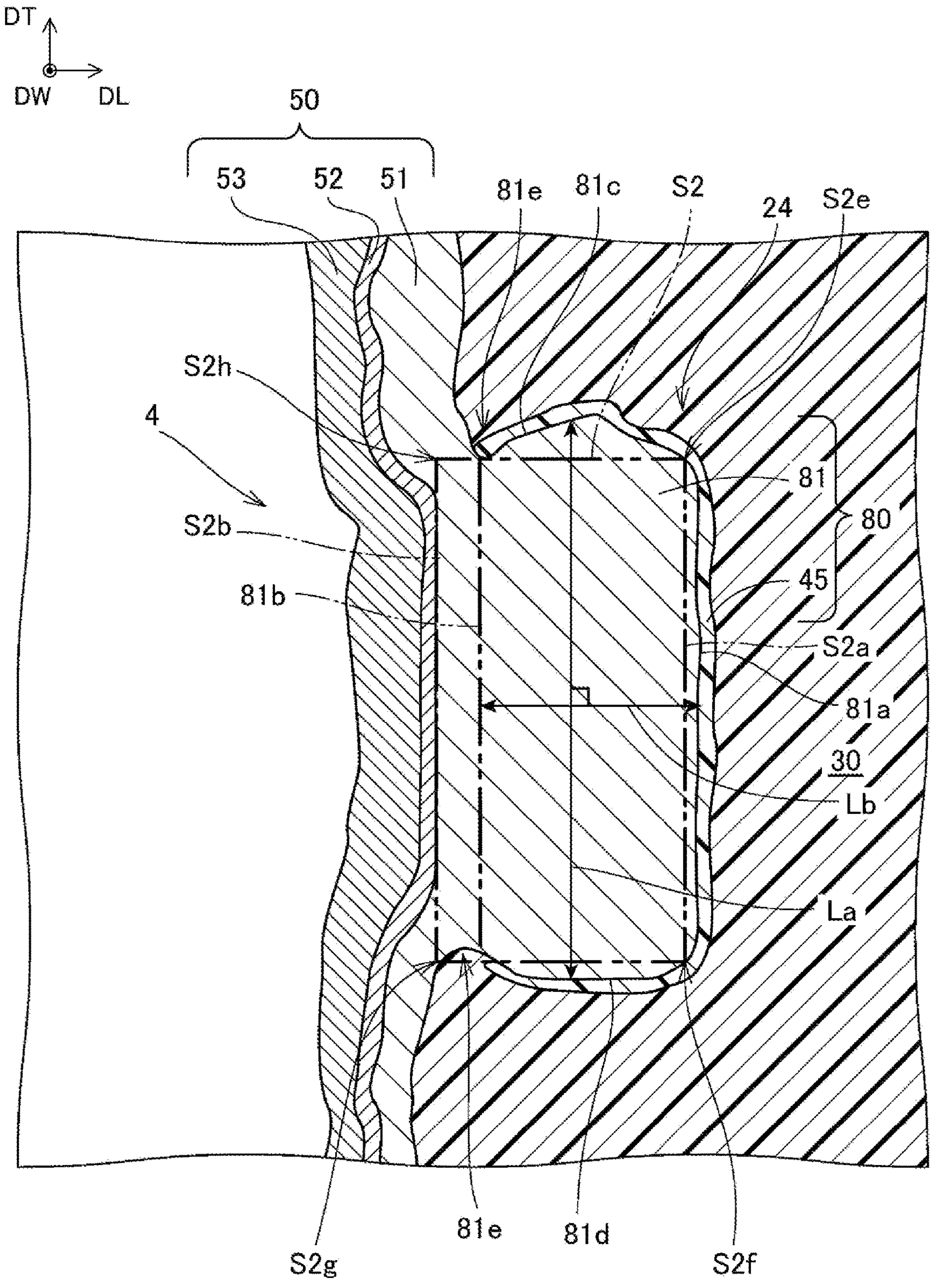
FIG. 12 is a cross-sectional view when a normal conductor corresponding to FIG. 11 is used.

FIG. 12 is a cross-sectional view when the normal conductor 81 corresponding to FIG. 11 is used.

Since the normal conductor 81 does not have a rectangular shape with four right-angled corners, the length of the conductor outer peripheral surface 81*b* in the direction of the line width La is shorter than the line width La of the conductor 81, and the conductor side surfaces 81*c* and 81*d* on both sides of the conductor outer peripheral surface 81*b* in the direction of the line width La are likely to have curved surfaces with large curvatures.

Here, in manufacturing the inductor, in a conductive wire 80 of the normal conductor 81, when the coil conductor 20 is embedded in the element body 2, the thickness of the element body 2 on the curved surfaces where the conductor outer peripheral surface 81*b* and the conductor side surfaces 81*c* and 81*d* are connected to each other (in other words, the length in the length direction DL from the outer surface of the element body 2 to the above curved surface) is larger than the thickness of the element body 2 on the conductor outer peripheral surface 81*b* (in other words, the length in the length direction DL from the outer surface of the element body 2 to the conductor outer peripheral surface 81*b*). Therefore, when the coating layer 45 on the conductor outer peripheral surface 81*b* side of the conductive wire 80 embedded in the element body 2 is peeled off in the surface treatment process, only the coating layer 45 on the conductor outer peripheral surface 81*b* side is easily peeled off due to the different thicknesses of the element body 2, and the coating layer 45 and the magnetic particles on the curved surfaces connecting the conductor outer peripheral surface 81*b* and the conductor side surfaces 81*c* and 81*d* are likely to be left. For this reason, when plating is grown on the conductor outer peripheral surface 81*b*, a constricted shape 81*e* is likely to be formed at a connection portion between the conductive wire 80 and the plated conductor 50. That is, in the normal conductor 81, the conductor outer peripheral surface 81*b* and the plated conductor 50 are connected to each other so as to form the constricted shape 81*e*, therefore, a connection area between the conductor 81 and the plated conductor 50 is likely to be smaller than the line width La. As such, there is a problem in that the DC resistance of the outer electrode 4 increases or connection reliability between the outer electrode 4 and the conductor 81 of the coil conductor 20 decreases.

On the other hand, since the conductor 43 of the present embodiment has a substantially rectangular shape, when the coil conductor 20 is embedded in the element body 2, the thickness of the element body 2 on the corner portions of the conductor outer peripheral surface 43*b* and the conductor side surfaces 43*c* and 43*d* are less likely to be larger than the thickness of the element body 2 on the conductor outer peripheral surface 43*b*. Therefore, when the coating layer 45 on the conductor outer peripheral surface 43*b* side of the conductive wire 42 embedded in the element body 2 is peeled in the surface treatment process, not only the coating layer 45 on the conductor outer peripheral surface 43*b* but also the coating layer 45 of the conductor side surfaces 43*c* and 43*d* on the conductor outer peripheral surface 43*b* side can be peeled.

Note that in FIG. 11, the positions of an end of the coating layer 45 are different in the right-left direction between the conductor side surface 43*c* and the conductor side surface 43*d* due to a direction of laser irradiation in the surface treatment process. That is, in FIG. 11, the laser beam is applied while moving from the bottom to the top (in a direction from the conductor side surface 43*d* toward the conductor side surface 43*c* with respect to the conductive wire 42) to remove the resin layer. For this reason, in the conductor side surface 43*d*, the coating layer 45 is easily removed because the laser beam moves closer to each other, whereas in the conductor side surface 43*c*, the coating layer 45 is hardly removed because the laser beam moves away from each other. Thus, the position of an end of the coating layer 45 on the conductor side surface 43*d* is cut to the inner side of the element body 2 relative to the position of an end of the coating layer on the conductor side surface 43*c*.

At this time, when the plating is grown on the conductor outer peripheral surface 43*b*, the plating is likely to be formed not only on the conductor outer peripheral surface 43*b* but also on the conductor side surfaces 43*c* and 43*d* exposed from the coating layer 45 at positions adjacent to the conductor outer peripheral surface 43*b*, thus, the plated conductor 50 protruding outward from the conductor side surfaces 43*c* and 43*d* in the thickness direction DT is formed. Therefore, since the shape formed by the conductor outer peripheral surface side of the conductor 43 and the plated conductor 50 can be made to spread toward the outer surface of the element body 2, it is possible to prevent the occurrence of a constricted shape in the conductor side surfaces 43*c* and 43*d* portions, and to make a connection area between the conductor outer peripheral surface 43*b* and the plated conductor 50 substantially equal to the line width La. To be specific, the plated conductor 50 is formed on the conductor side surfaces 43*c* and 43*d* such that of angles θ3 and 04 formed by a circumscribed line 50*a* of the plated conductor 50 formed on the conductor outer peripheral surface 43*b* and a circumscribed line 50*b* of the plated conductor 50 formed on the conductor side surfaces 43*c* and 43*d*, the angle θ3 on the conductor 43 side is equal to or less than 90°.

It can also be restated as follows. That is, in the cross section illustrated in FIG. 11, a virtual inscribed rectangle S2 is set so as to be inscribed in a surface of the copper plating layer 51 formed on the conductor inner peripheral surface 43*a* and the conductor side surfaces 43*c* and 43*d* and the conductor outer peripheral surface 43*b* of the conductors 43. The inscribed rectangle S2 is a virtual rectangle set on the conductor 43 side so as to satisfy the following four conditions. First, the inscribed rectangle S2 is set such that a side S2*b* on the conductor outer peripheral surface 43*b* side is inscribed in the copper plating layer 51 of the plated conductor 50. Second, the inscribed rectangle S2 is set such that a side S2*a* (the side S2*a* opposite to the side S2*b*) on the conductor inner peripheral surface 43*a* side is inscribed in the conductor 43 (including a case where an end of the side S2*a*, that is, at a corner, is in contact with the conductor 43). Thirdly, the inscribed rectangle S2 is set such that the area ratio of the area occupied by the conductor 43 and the copper plating layer 51 with respect to an area of the inscribed rectangle S2 is maximized while satisfying the first condition and the second condition.

In the present embodiment, in the inscribed rectangle S2 set as described above, corners S2*e* and S2*f* on the conductor inner peripheral surface 43*a* side are likely to be occupied by the right-angled rectangular conductors 43, and corners S2*g* and S2*h* on the copper plating layer 51 side are occupied by the copper plating layer 51 on the conductor outer peripheral surface 43*b*. At this time, the area ratio of the conductor 43 and the copper plating layer 51 with respect to the inscribed rectangle S2, i.e., the area ratio of copper, which is a metal for the conductor 43, was equal to or more than 99%.

Therefore, since the conductor 43 of the present embodiment has a rectangular cross-section with four right-angled corners, the conductor 43 can be easily connected to the coil conductor 20 with the copper plating layer 51 having a size equal to or larger than the size of the conductor outer peripheral surface 43*b*, and the conductor 43 and the plated conductor 50 are widely connected to each other. Therefore, the DC resistance of the outer electrode 4 can be reduced, and the connection reliability between the outer electrode 4 and the coil conductor 20 can be improved.

Note that as illustrated in FIG. 12, when the inscribed rectangle S2 is set as described above with respect to the normal conductor 81, the constricted shape 81*e* enters the inscribed rectangle S2.

B-2. Configuration of Outer Electrode on Surface of Element Body

Next, the configuration of the outer electrode 4 on the surface of the element body will be described.

Figure 13:
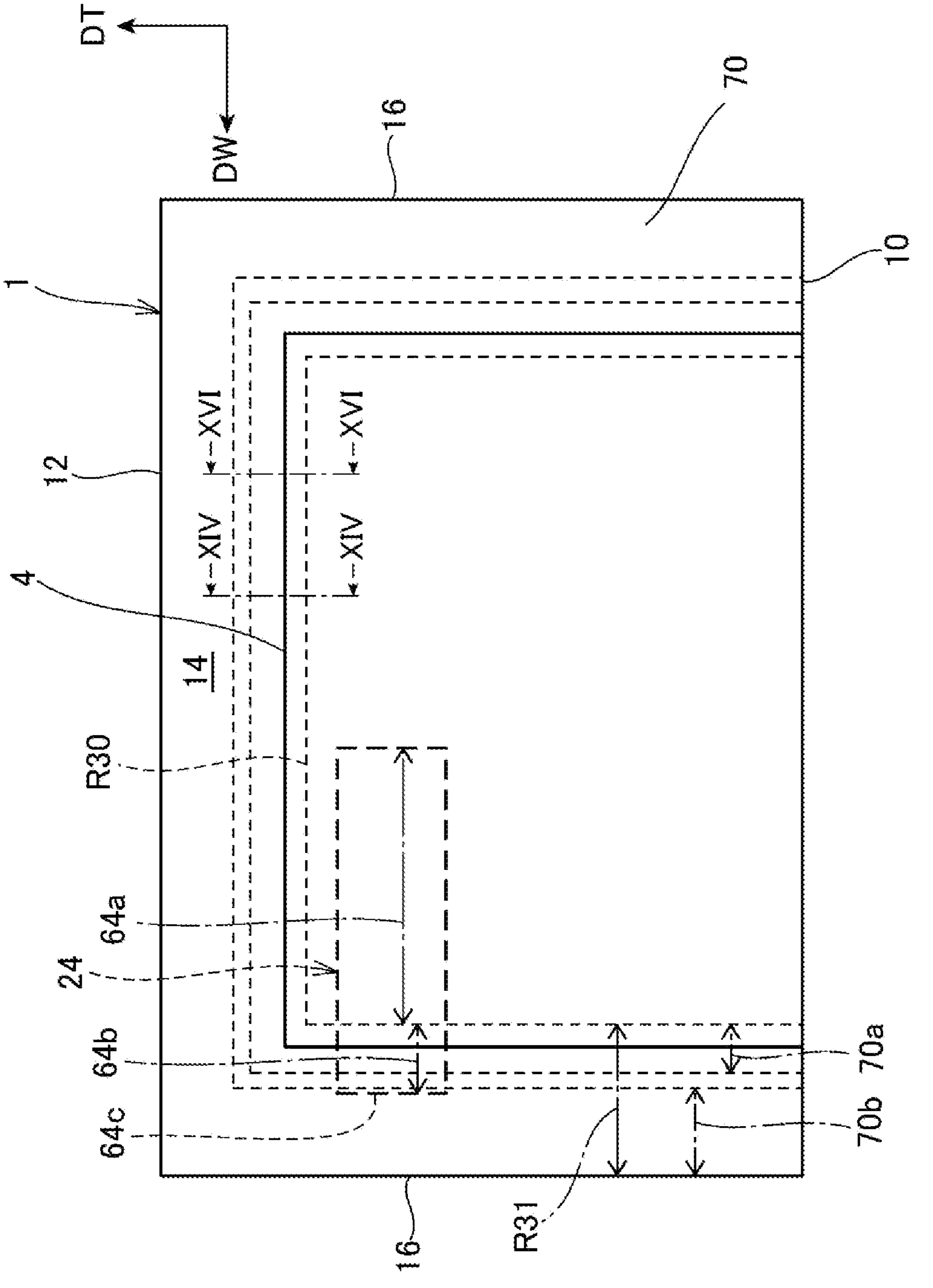
FIG. 13 is a side view of an inductor 1 viewed from an end surface 14 side.

B-2-1. Configuration of Predetermined Electrode Portion and Outer Electrode Connection Portion FIG. 13 is a side view of the inductor 1 viewed from the end surface 14 side of the element body 2. As described above, the outer electrode 4 is formed by plating so as to cover a predetermined electrode portion R30. The predetermined electrode portion R30 is formed by peeling off an element body coat 70 in the surface treatment process, the element body coat 70 being insulating resin coated on the surface of the element body in the element body protective layer forming process. The predetermined electrode portion R30 is formed in a rectangular shape on each of the end surface 14 and the bottom surface 10 of the element body 2.

As illustrated in FIG. 13, the predetermined electrode portion R30 is formed in a region that overlaps the portion of the outer electrode connection portion 24 exposed from the end surface 14 of the element body 2. On the end surface 14 of the element body 2, the outer electrode connection portion 24 is exposed along the width direction DW of the element body 2 over the predetermined electrode portion R30 and a coating portion R31 that is a region in an outer side portion of the predetermined electrode portion R30. In the outer electrode connection portion 24 exposed from the end surface 14 of the element body 2, a coated portion 64*b* located at the coating portion R31 is located closer to a tip 64*c* side of the outer electrode connection portion 24 than a peeled portion 64*a* located at the predetermined electrode portion R30. That is, the tip 64*c* of the outer electrode connection portion 24 is located at the coating portion R31. In addition, an area of the peeled portion 64*a* is set to be larger than a cross-sectional area of the conductive wire constituting the coil conductor 20.

As described above, the surface protective layer forming process is performed after the element body forming and curing process and the element body grinding process. That is, an entire surface of the outer electrode connection portion 24 exposed from the end surface 14 after the surface protective layer forming process is coated with the insulating resin. In addition, in the surface treatment process, a part of the coating is peeled off to form the predetermined electrode portion R30.

At this time, in the outer electrode connection portion 24 exposed from the end surface 14 of the element body 2, only the coating applied to the peeled portion 64*a* is peeled off, and the peeled portion 64*a* is connected to the outer electrode 4 in the plating layer forming process. As described above, since the area of the peeled portion 64*a* is set to be larger than the cross-sectional area of the conductive wire constituting the coil conductor 20, the resistance is unlikely to increase at a connection portion between the peeled portion 64*a* and the outer electrode 4.

On the other hand, even after the surface treatment process, the element body coat 70 remains in the coating portion R31. As such, the coated portion 64*b* is in a state of being covered with the element body coat 70, and the tip 64*c* of the outer electrode connection portion 24 is covered at least with the element body coat 70. Since the coated portion 64*b* and the tip 64*c* are covered with the element body coat 70, the outer electrode connection portion 24 exposed from the end surface 14 is fixed to the end surface 14 by the element body coat 70 on the tip 64*c* side. For this reason, the outer electrode connection portion 24 is not easily peeled off from the end surface 14 until the outer electrode 4 is formed, and the connection between the outer electrode 4 and the outer electrode connection portion 24 is easily stabilized.

As illustrated in FIG. 13, the coating portion R31 includes a first thickness region 70*a* and a second thickness region 70*b*. The coated portion 64*b* is covered by both the first thickness region 70*a* and the second thickness region 70*b*.

In addition, in the outer electrode connection portion 24 exposed from the end surface 14 of the element body 2, the coating layer of the conductive wire is removed when the coating is removed at the peeled portion 64*a*, the exposed conductor is connected with the outer electrode 4 in the plating layer forming process, the coated portion 64*b* is covered with the element body coat 70 (i.e., both the first thickness region 70*a* and the second thickness region 70*b*) in a state where the coating layer of the conductive wire remains, and the coating layer of the conductive wire is located between the conductor and the element body coat 70. Further, an area of a region of the outer electrode connection portion 24 connected to the outer electrode is equal to or larger than the cross-sectional area of the conductive wire constituting the coil conductor 20.

Furthermore, the length of the coated portion 64*b* of the outer electrode connection portion 24 is equal to or more than 5% of the length of the outer electrode connection portion 24. The longer the length of the coated portion 64*b* of the outer electrode connection portion 24 is, the larger the fixing force on the end surface of the element body 2 applied by the element body coat 70 can be, however, when the length of the coated portion 64*b* exceeds 50% of the length of the outer electrode connection portion 24, the area for connecting to the outer electrode 4 decreases. Therefore, the length of the coated portion 64*b* to the outer electrode connection portion 24 is equal to or more than 5% and equal to or less than 50% (i.e., from 5% to 50%), preferably equal to or more than 10% and equal to or less than 45% (i.e., from 10% to 45%).

Furthermore, the peeled portion 64*a* of the outer electrode connection portion 24 on the side opposite to the tip 64*c* (i.e., the base of the outer electrode connection portion 24) is located at a position within 50% of the length of the end surface of the element body 2 in the DW direction with respect to the center of the length of the end surface 14 of the element body 2 in the DW direction as a center (in FIG. 13, 7% of the length of the end surface of the element body 2 in the DW direction on the left side of the center of the length of the end surface 14 of the element body 2 in the DW direction). At this position, the outer electrode connection portion 24 is extended from the extended portion having the coating layer embedded in the element body 2 to the end surface of the element body 2, the outer electrode connection portion 24 on the side opposite to the tip 64*c* at the coating layer of the conductive wire is removed, and the conductor of the conductive wire is exposed from the end surface 14 of the element body 2 and is also exposed from the element body coat. When the peeled portion 64*a* of the outer electrode connection portion 24 on the tip 64*c* side is too close to the center of the length of the end surface 14 of the element body 2 in the DW direction, an area of the outer electrode cannot be increased, therefore, in FIG. 13, the peeled portion 64*a* on the tip 64*c* side is arranged at a position of equal to or more than 14% and equal to or less than 20% (i.e., from 14% to 20%), preferably 17% of the length of the end surface of the element body 2 in the DW direction from the side surface 16 side on the left side of the end surface 14 of the element body 2. At this position, the outer electrode connection portion 24 on the tip 64*c* side is covered with the coating portion R31 of the element body coat 70 and the coating layer of the conductive wire.

In addition, when the tip 64*c* of the outer electrode connection portion 24 is too close to the center of the length of the end surface 14 of the element body 2 in the DW direction, the area of the outer electrode cannot be increased, therefor, in FIG. 13, the tip 64*c* of the outer electrode connection portion 24 is arranged at a position of equal to or more than 6% and equal to or less than 12% (i.e., from 6% to 12%), preferably 9% of the length of the end surface of the element body 2 in the DW direction from the side surface 16 side on the left side of the end surface 14 of the element body 2.

B-2-2. Configuration of Outer Electrode and Element Body Coat

As illustrated in FIG. 13, when the inductor 1 is viewed from the one end surface 14 side, the outer electrode 4 is arranged so as to be biased toward the bottom surface 10 side of the end surface 14, and the outer electrode 4 is surrounded by the element body coat 70.

The first thickness region 70*a* is formed in a boundary region between the predetermined electrode portion R30 and the coating portion R31. The second thickness region 70*b* is located farther away from the predetermined electrode portion R30 than the first thickness region 70*a* when viewed from the predetermined electrode portion R30. The first thickness region 70*a* is provided on the end surface 14 and the bottom surface 10 at the position to surround the predetermined electrode portion R30 formed on the end surface 14 and the bottom surface 10 of the element body 2.

Figure 14:
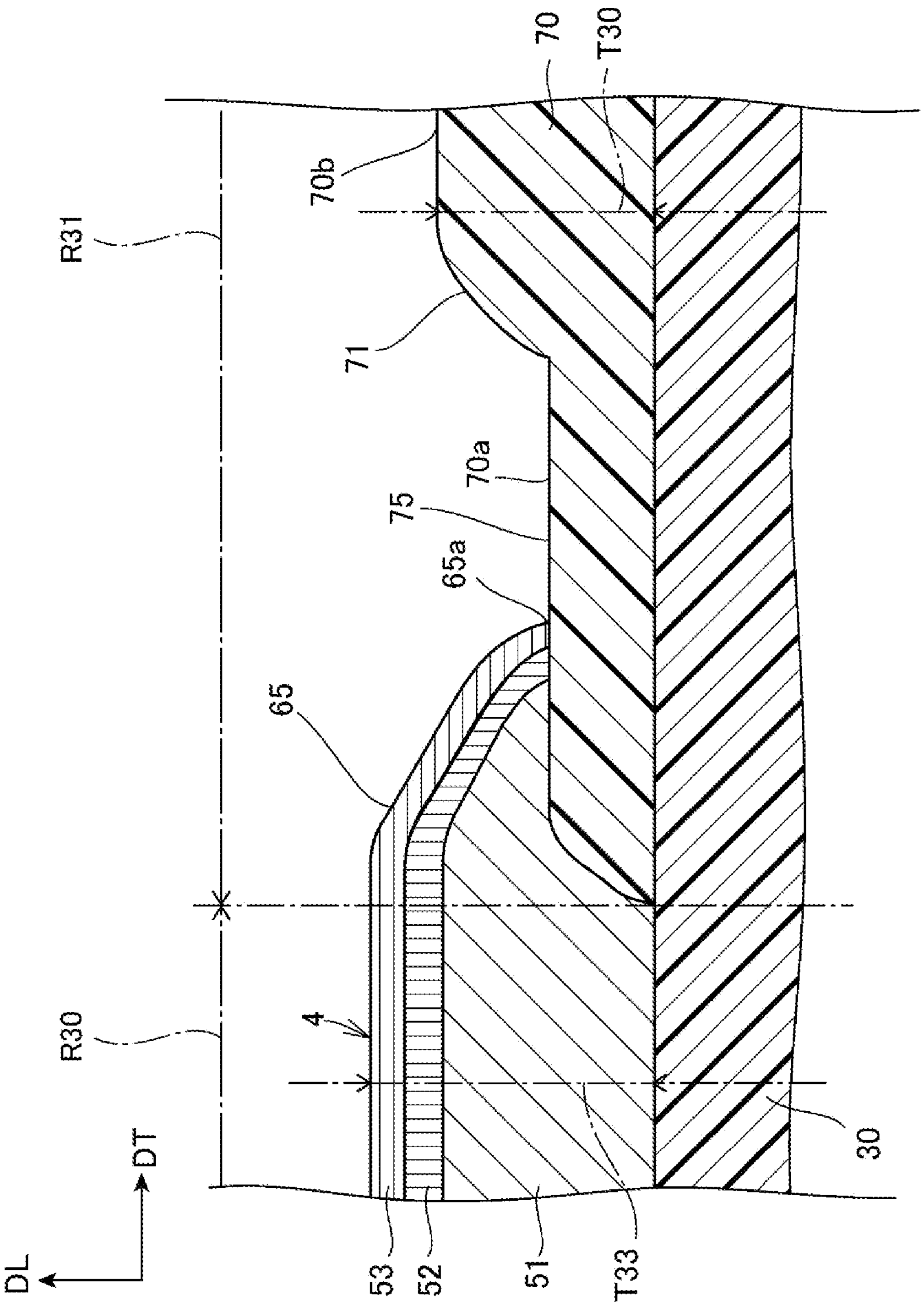
FIG. 14 is a view schematically illustrating a cross section taken along line XIV-XIV in FIG. 13.

FIG. 14 is a view schematically illustrating a cross section taken along line XIV-XIV in FIG. 13. Note that the XIV-XIV cross section is a cross section perpendicular to a boundary between the predetermined electrode portion R30 and the coating portion R31 in a side view from the end surface 14 side of the element body 2. That is, the XIV-XIV cross section is a cutting plane obtained by cutting the element body 2 in the length direction DL along a straight line orthogonal to a boundary between the outer electrode 4 and the element body coat 70 when viewed from the end surface 14. In addition, in the XIV-XIV cross section, the DT direction is a direction away from the predetermined electrode portion R30.

In the surface treatment process, the first thickness region 70*a* is formed by removing a part of the element body coat 70 by emitting the laser beam while adjusting the irradiation time and the irradiation power such that the irradiation amount of the laser beam is smaller than the irradiation amount of the laser beam with which the predetermined electrode portion R30 is irradiated. As such, the thickness of the first thickness region 70*a* is smaller than an average thickness T30 of the element body coat 70.

The average thickness T30 is an average value of the thicknesses of the element body coat 70 at positions sufficiently away from the predetermined electrode portion R30 in the element body coat 70 covering the entire element body 2. The average thickness T30 is obtained, for example, as an average value of measured values of the thicknesses of the element body coat 70 measured at arbitrary three points in a central portion of the upper surface around the winding axis K in a cutting plane vertically cut along a virtual line extending along the length direction DL of the element body 2 passing through the winding axis K of the coil when the element body 2 is viewed from the upper surface.

The second thickness region 70*b* is a portion of the element body coat 70 formed in the surface protective layer forming process that has not received the laser beam in the surface treatment process. The thickness of the second thickness region 70*b* is substantially equal to the average thickness T30 and is larger than the thickness of the first thickness region 70*a*.

As illustrated in FIG. 14, in the XIV-XIV cross section, a flat portion 75 and a stepped portion 71 are provided in the first thickness region 70*a*. The flat portion 75 is a portion of the first thickness region 70*a* where the thickness of the element body coat 70 is approximately constant on average. The stepped portion 71 is a portion of the first thickness region 70*a* that becomes abruptly thicker in the direction away from the predetermined electrode portion R30. The stepped portion 71 connects the flat portion 75 and the second thickness region 70*b* that have different thicknesses, and the formation of the stepped portion 71 facilitates the formation of the flat portion 75 and the second thickness region 70*b*. The stepped portion 71 is formed to be inclined by, for example, about 17 degrees with respect to the flat portion 75.

As illustrated in FIG. 14, a peripheral edge 65, which is a part of the outer electrode 4, is formed on the first thickness region 70*a*. A tip 65*a* of the peripheral edge 65 of the outer electrode 4, which is located farthest away from the predetermined electrode portion R30, is located on the flat portion 75 of the first thickness region 70*a*. For this reason, the peripheral edge 65 of the outer electrode 4 is not formed on the stepped portion 71 and the second thickness region 70*b*. In other words, the tip 65*a* of the peripheral edge 65 of the outer electrode 4 is located closer to the predetermined electrode portion R30 side than the stepped portion 71 and the second thickness region 70*b*. In addition, in the direction away from the predetermined electrode portion R30, the length of the peripheral edge 65 of the outer electrode 4 is shorter than the length of the flat portion 75 of the first thickness region 70*a*. In other words, in the XIV-XIV cross section, the length of the flat portion 75 in the direction away from the predetermined electrode portion R30 is longer than the length of the portion (peripheral edge 65) of the outer electrode 4 formed on the element body coat 70. For this reason, the entire peripheral edge 65 of the outer electrode 4 is easily formed on the flat portion 75 of the first thickness region 70*a*.

The outer electrode 4 has a copper plating layer (first plating layer) 51, a Ni plating layer (second plating layer) 52, and a Sn plating layer (third plating layer) 53. The copper plating layer 51 is a portion formed first by plating in the plating layer forming process. The copper plating layer 51 is slightly formed also on the coating portion R31. However, since the element body coat 70 has insulation properties, the copper plating layer 51 of the outer electrode 4 on the coating portion R31, that is, the copper plating layer 51 of the peripheral edge 65 of the outer electrode 4 is thinner than the copper plating layer 51 formed in contact with the core 30 constituting the element body 2 at the predetermined electrode portion R30.

The Ni plating layer 52 is formed by plating next to the copper plating layer 51 and is formed on the copper plating layer 51. The Sn plating layer 53 is formed by plating next to the Ni plating layer 52, and is formed on the Ni plating layer 52. The Ni plating layer 52 and the Sn plating layer 53 of the peripheral edge 65 of the outer electrode 4 are formed on the copper plating layer 51 and the Ni plating layer 52, respectively, which are conductors. As such, the thicknesses of the Ni plating layer 52 and the Sn plating layer 53 at the peripheral edge 65 of the outer electrode 4 are substantially equal to the thicknesses of the Ni plating layer 52 and the Sn plating layer 53 located at the predetermined electrode portion R30.

Since the copper plating layer 51 at the peripheral edge 65 of the outer electrode 4 is thinner than the copper plating layer 51 at the other portions, the peripheral edge 65 is formed to have thickness smaller than an average thickness T33 of the outer electrode 4.

The average thickness T33 of the outer electrode 4 is larger than the average thickness T30, and the outer electrode 4 protrudes more outward than the element body coat 70 from the end surface 14 and the bottom surface 10. In other words, in the XIV-XIV cross section, the thickness of the portion of the outer electrode 4 formed on the surface of the element body 2 (the portion formed in the predetermined electrode portion R30) is larger than the thickness of the second thickness region 70*b*. Thus, the outer electrode 4 can be easily connected to a substrate or the like at the time of mounting. The average thickness T33 of the outer electrode 4 is obtained, for example, as an average value of thicknesses at three or more arbitrary points of the outer electrode 4 excluding the peripheral edge 65 and the connection portion with the peeled portion 64*a* in a cutting plane vertically cut along a virtual line extending along the length direction DL of the element body 2 passing through the winding axis K of the coil when the element body 2 is viewed from the upper surface.

As described above, the peripheral edge 65 of the outer electrode 4 thinner than the average thickness T33 is formed on the first thickness region 70*a* having the thickness equal to or less than the thickness of the second thickness region 70*b*. As such, the peripheral edge 65 of the outer electrode 4 on the first thickness region 70*a* is unlikely to protrude in a direction away from the element body 2. That is, the peripheral edge 65 of the outer electrode 4 is less likely to protrude to the outer side portion of the end surface 14 and the bottom surface 10 of the element body 2 than the outer electrode 4 formed at the predetermined electrode portion R30. In addition, the thickness of the tip 65*a* of the outer electrode 4 is smaller than a difference in thickness between the first and second thickness regions 70*a* and 70*b*, and the tip 65*a* of the outer electrode 4 is located closer to the element body 2 and the core 30 side than a surface of the second thickness region 70*b*. For this reason, the tip 65*a* is unlikely to protrude in the direction away from the element body 2.

Furthermore, as described above, since the first thickness region 70*a* is arranged at a position surrounding the predetermined electrode portion R30, the first thickness region 70*a* surrounds the outer electrode 4. For this reason, around the outer electrode 4, the peripheral edge 65 is less likely to protrude in the direction away from the element body 2 and in a direction away from the core 30.

Figure 15:
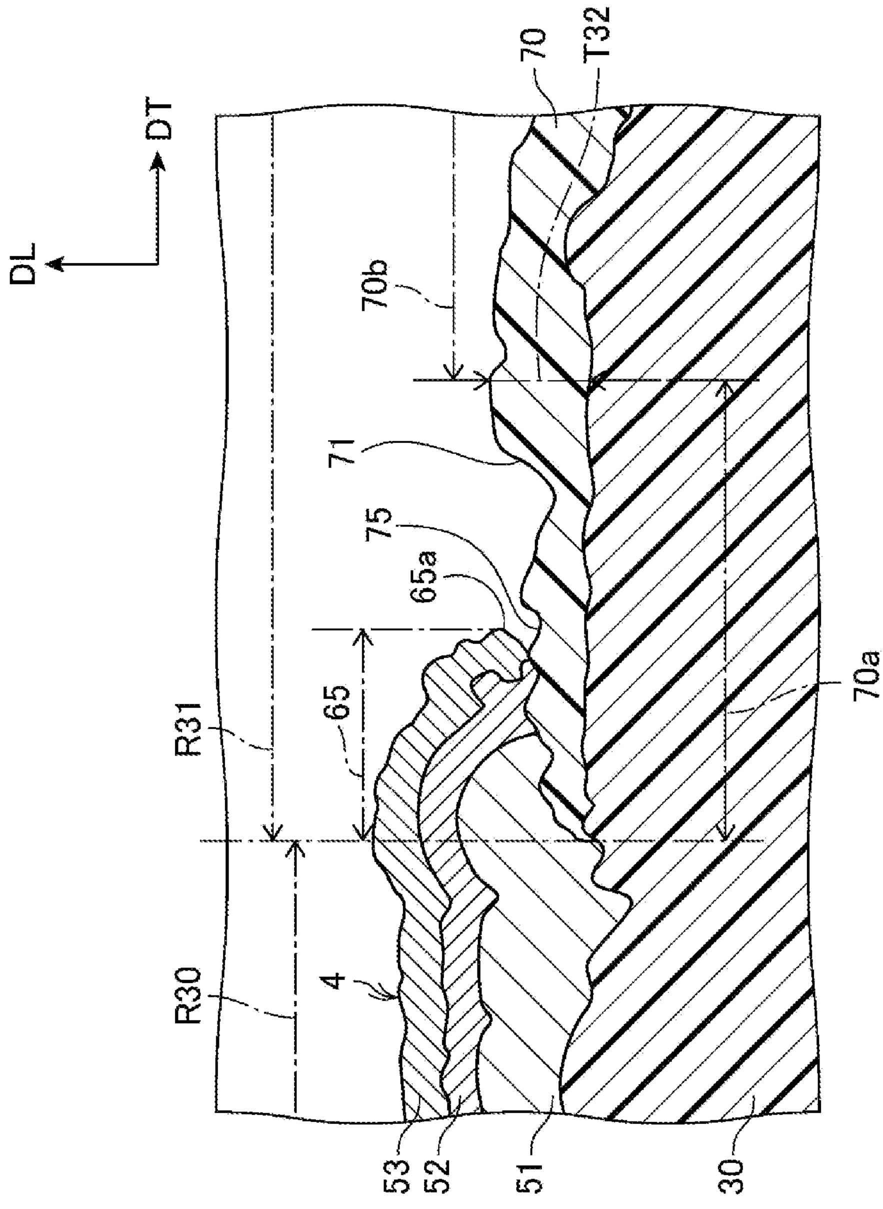
FIG. 15 is a cross-sectional view taken along line XIV-XIV of FIG. 13.

FIG. 15 is a cross-sectional view taken along line XIV-XIV of FIG. 13. As illustrated in FIG. 15, in practice, the thickness and shape of the first thickness region 70*a* vary depending on the accuracy of laser processing for irradiating the element body coat 70 with the laser beam. Hereinafter, a specific definition of each element will be described with reference to FIG. 15.

In the XIV-XIV cross section, the first thickness region 70*a* is defined as the element body coat 70 extending from a portion of the element body coat 70 closest to the predetermined electrode portion R30 to the portion of the element body coat 70 having a maximum thickness T32 in the XIV-XIV cross section.

In the XIV-XIV cross section, the second thickness region 70*b* is a portion in which the element body coat 70 has the maximum thickness T32 in the XIV-XIV cross section. More strictly, in the XIV-XIV cross section, the second thickness region 70*b* is defined as the element body coat 70 located on the side in the direction away from the predetermined electrode portion R30 starting from the portion in which the thickness of the element body coat 70 is the maximum thickness T32 in the XIV-XIV cross section.

Figure 16:
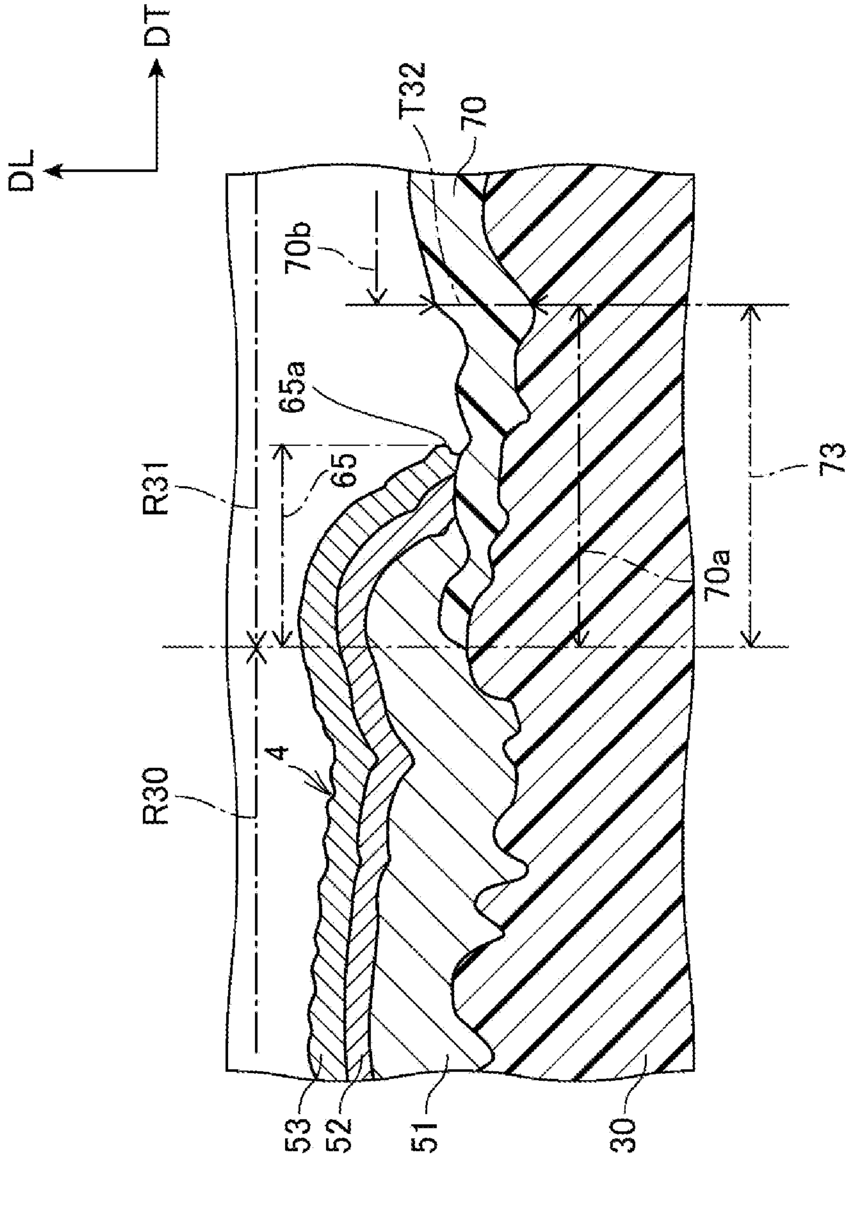
FIG. 16 is a cross-sectional view taken along line XVI-XVI of FIG. 13.

FIG. 16 is a cross-sectional view taken along line XVI-XVI of FIG. 13. The XVI-XVI cross section is a cutting plane obtained by cutting the element body 2 in the length direction DL along a straight line orthogonal to the boundary between the outer electrode 4 and the element body coat 70 when viewed from the end surface 14. In the XVI-XVI cross section, the DT direction is the direction away from the predetermined electrode portion R30. As illustrated in FIG. 16, in the XVI-XVI cross section, in the boundary region between the predetermined electrode portion R30 and the coating portion R31, an inclined portion 73 is formed in the element body coat 70 so as to become thicker on average in the direction away from the predetermined electrode portion R30. In other words, in the XVI-XVI cross section, the inclined portion 73 is a portion in which the thickness of the element body coat 70 is averagely increased toward the second thickness region 70*b*. The inclined portion 73 is formed in the direction away from the predetermined electrode portion R30 from the boundary between the predetermined electrode portion R30 and the coating portion R31 to a position where the element body coat 70 has the maximum thickness T32 in the XVI-XVI cross section. For this reason, the inclined portion 73 is formed in the entire first thickness region 70*a* in the XVI-XVI cross section. In addition, in the XVI-XVI cross section, the flat portion 75 is not formed in the first thickness region 70*a*.

In addition, in the XVI-XVI cross section, the stepped portion 71 in which the thickness abruptly changes is not formed in the first thickness region 70*a*. That is, the difference in thickness between the first thickness region 70*a* and the second thickness region 70*b* is formed not by the stepped portion 71 in which the thickness of the element body coat 70 changes abruptly but by the inclined portion 73. In the XVI-XVI cross section, the first thickness region 70*a* is the element body coat 70 from a portion of the element body coat 70 closest to the predetermined electrode portion R30 to a portion of the element body coat 70 having the maximum thickness T32 in the XVI-XVI cross section. In addition, in the XVI-XVI cross section, the second thickness region 70*b* is the element body coat 70 located on the side in the direction away from the predetermined electrode portion R30 from the portion in which the element body coat 70 has the maximum thickness T32 in the XVI-XVI cross section. The formation of the inclined portion 73 facilitates the formation of the first thickness region 70*a* and the second thickness region 70*b* even when the stepped portion 71 is not formed.

As described above, in the element body coat 70, the difference in thickness between the first thickness region 70*a* and the second thickness region 70*b* may be caused by the stepped portion 71 or by the inclined portion 73. As in the present embodiment, in the element body coat 70 of one inductor 1, a portion in which the stepped portion 71 is formed and a portion in which the inclined portion 73 is formed may be mixed in each cutting plane. In addition, only one of the stepped portion 71 and the inclined portion 73 may be formed in the element body coat 70 of one inductor 1.

Up to this point, in [B-2-2. Configuration of Outer Electrode and Element Body Coat], the description based on the one end surface 14 illustrated in FIG. 13 also applies to the other end surface 14 on the opposite side of the element body 2.

In addition, in [B-2-2. Configuration of Outer Electrode and Element Body Coat], the end surface 14 has been described with reference to FIG. 13 to FIG. 16. When the element body 2 is viewed from the bottom surface 10 side, the inductor 1 also has the outer electrode 4 located on the one end surface 14 side, the outer electrode 4 located on the other end surface 14 side, and the element body coat 70 surrounding the two outer electrodes 4 (see FIG. 2). For this reason, the above description of the end surface 14 with reference to FIG. 13 to FIG. 16 also applies to the bottom surface 10. That is, the above description using the cutting planes of FIG. 14 to FIG. 16 also applies to a cutting plane cut in the thickness direction DT of the element body 2 along a straight line orthogonal to the boundary between arbitrary one of the outer electrodes 4 and the element body coat 70 when viewed from the bottom surface 10.

Other Embodiments

In the embodiment illustrated in [B-2-1. Configuration of Predetermined Electrode Portion and Outer Electrode Connection Portion] described above, it has been described that the element body coat 70 has the first thickness region 70*a* and the second thickness region 70*b*, but this is merely an example. The element body coat 70 need not include the first thickness region 70*a* and the second thickness region 70*b*.

In the embodiment illustrated in [B-2-2. Configuration of Outer Electrode and Element Body Coat] described above, it has been described that the tip 65*a* of the peripheral edge 65 of the outer electrode 4 is located on the flat portion 75 of the first thickness region 70*a*, but this is merely an example. For example, the tip 65*a* of the peripheral edge 65 may be positioned on the stepped portion 71.

In the embodiment illustrated in [B-2-2. Configuration of Outer Electrode and Element Body Coat] described above, it has been described that in the XIV-XIV cross section, the thickness of the portion of the outer electrode 4 formed on the surface of the element body 2 is greater than the thickness of the second thickness region 70*b*, but this is merely an example. That is, in a cutting plane obtained by cutting the element body 2 in the length direction DL along a straight line orthogonal to the boundary between the outer electrode 4 and the element body coat 70 when viewed from the end surface 14, the thickness of the portion of the outer electrode 4 formed on the surface of the element body 2 may be smaller than the thickness of the second thickness region 70*b*.

All the embodiments and modifications described above exemplify one aspect of the present disclosure, and can be arbitrarily modified and applied without departing from the gist of the present disclosure.

In addition, directions such as horizontal, orthogonal, and vertical directions, various numerical values, shapes, and materials in the above-described embodiments include ranges (so-called equivalent ranges) in which the same operational effects as those of the directions, the numerical values, the shapes, and the materials are achieved unless otherwise specified.

Configurations Supported by the Above Embodiments

The above-described embodiment supports the following configurations.

(Configuration 1) An inductor comprising an element body containing metal magnetic powder and resin and having a coil conductor embedded in the element body; an element body coat covering a surface of the element body; and an outer electrode formed on the surface of the element body. The coil conductor has a winding portion, an extended portion extended from the winding portion, and an outer electrode connection portion leading to the extended portion and connected to the outer electrode, and the outer electrode connection portion has a region covered with the element body coat and a region connected to the outer electrode on the surface of the element body.

According to the inductor of Configuration 1, the outer electrode connection portion exposed on the surface of the element body can be fixed to the element body by the element body coat. For this reason, the outer electrode connection portion is less likely to be peeled off from the element body, and the stability of the connection between the coil conductor and the outer electrode is improved.

(Configuration 2) The inductor according to Configuration 1, wherein a tip of the outer electrode connection portion is covered with the element body coat.

According to the inductor of Configuration 2, the element body coat can prevent the tip of the outer electrode connection portion from being peeled off from the element body.

(Configuration 3) The inductor according to Configuration 1 or 2, wherein the element body coat has a first thickness region and a second thickness region thicker than the first thickness region in a portion covering the outer electrode connection portion.

According to the inductor of Configuration 3, while the outer electrode connection portion is fixed to the element body by the element body coat, a portion of the outer electrode formed on the element body coat is less likely to protrude. Therefore, it is easy to increase the size of the external shape of the element body. With this configuration, it is easy to achieve both improvement in the stability of the connection between the coil conductor and the outer electrode and improvement in characteristics of the inductor.

(Configuration 4) The inductor according to any one of Configurations 1 to 3, wherein in the outer electrode connection portion, an area of a region connected to the outer electrode has an area equal to or larger than a cross-sectional area of a conductive wire constituting the coil conductor.

According to the inductor of Configuration 4, the coil conductor and the outer electrode are easily connected to each other in an area equal to or larger than the cross-sectional area of the conductive wire. Therefore, the resistance of the connection portion between the coil conductor and the outer electrode is less likely to be larger than the resistance of the conductive wire, and the resistance of the inductor can be reduced.

(Configuration 5) The inductor according to any one of Configurations 1 to 4, wherein in a region of the outer electrode connection portion covered with the element body coat, a coating layer of the conductive wire is present between the element body coat and a conductor of a conductive wire constituting the coil conductor.

According to the inductor of Configuration 5, the coating layer is present between the conductor of the conductive wire and the element body coat at the outer electrode connection portion in the region covered with the element body coat, thus, even when the element body coat covering the outer electrode connection portion is peeled off due to an impact or the like, the conductor of the conductive wire can be protected by the coating layer.

(Configuration 6) The inductor according to Configuration 5, wherein a coating layer of the conductive wire of the outer electrode connection portion is equal to or more than 5% and equal to or less than 50% (i.e., from 5% to 50%) of a length of the outer electrode connection portion.

According to the inductor of Configuration 6, the connection between the outer electrode connection portion and the outer electrode can be ensured.

(Configuration 7) The inductor according to any one of Configurations 1 to 6, wherein a tip of the outer electrode connection portion is arranged such that a length between an end surface of the element body on a side surface side and a tip of the outer electrode connection portion is in a range of equal to or more than 6% and equal to or less than 12% (i.e., from 6% to 12%) of a length in a width direction of the end surface of the element body.

According to the inductor of Configuration 7, it is possible to increase a connection area between the outer electrode connection portion and the outer electrode.

(Configuration 8) The inductor according to any one of Configurations 1 to 7, wherein a base of the outer electrode connection portion is arranged within a range of 50% of a length of an end surface of the element body in a width direction with a center of the end surface of the element body in a width direction as a center.

According to the inductor of Configuration 8, it is possible to increase the connection area between the outer electrode connection portion and the outer electrode.

What is claimed is:

1. An inductor comprising:

an element body including metal magnetic powder and resin and having a coil conductor embedded in the element body;

an element body coat covering a surface of the element body; and an outer electrode on the surface of the element body, wherein the coil conductor has a winding portion, an extended portion extended from the winding portion, and an outer electrode connection portion leading to the extended portion and connected to the outer electrode, the outer electrode connection portion has a region covered with the element body coat and a region connected to the outer electrode on the surface of the element body, in a region of the outer electrode connection portion covered with the element body coat, a coating layer of a conductive wire configuring the coil conductor is present between the element body coat and a conductor of the conductive wire, and the coating layer being different from the element body coat.

2. The inductor according to claim 1, wherein a tip of the outer electrode connection portion is covered with the element body coat.

3. The inductor according to claim 1, wherein the element body coat has a first thickness region and a second thickness region thicker than the first thickness region in a portion covering the outer electrode connection portion.

4. The inductor according to claim 1, wherein in the outer electrode connection portion, an area of a region connected to the outer electrode has an area equal to or larger than a cross-sectional area of a conductive wire configuring the coil conductor.

5. The inductor according to claim 1, wherein the coating layer of the conductive wire of the outer electrode connection portion is from 5% to 50% of a length of the outer electrode connection portion.

6. The inductor according to claim 5, wherein a tip of the outer electrode connection portion is configured such that a length between an end surface of the element body on a side surface side and the tip of the outer electrode connection portion is in a range of from 6% to 12% of a length in a width direction of the end surface of the element body.

7. The inductor according to claim 5, wherein a base of the outer electrode connection portion is opposite to a tip of the outer electrode connection portion, an end surface of the element body has a center and a width direction extending from the center to a side surface of the element body, and a position of the base is configured such that, in the width direction, a distance from the base to the center in the width direction is less than 50% of a distance from the center to the side surface.

8. The inductor according to claim 1, wherein a tip of the outer electrode connection portion is configured such that a length between an end surface of the element body on a side surface side and the tip of the outer electrode connection portion is in a range of from 6% to 12% of a length in a width direction of the end surface of the element body.

9. The inductor according to claim 1, wherein
a base of the outer electrode connection portion is opposite to a tip of the outer electrode connection portion,
an end surface of the element body has a center and a width direction extending from the center to a side surface of the element body, and
a position of the base is configured such that, in the width direction, a distance from the base to the center in the width direction is less than 50% of a distance from the center to the side surface.

10. The inductor according to claim 2, wherein
the tip of the outer electrode connection portion is configured such that a length between an end surface of the element body on a side surface side and the tip of the outer electrode connection portion is in a range of from 6% to 12% of a length in a width direction of the end surface of the element body.

11. The inductor according to claim 2, wherein
a base of the outer electrode connection portion is opposite to the tip of the outer electrode connection portion,
an end surface of the element body has a center and a width direction extending from the center to a side surface of the element body, and
a position of the base is configured such that, in the width direction, a distance from the base to the center in the width direction is less than 50% of a distance from the center to the side surface.

12. The inductor according to claim 3, wherein
a tip of the outer electrode connection portion is configured such that a length between an end surface of the element body on a side surface side and the tip of the outer electrode connection portion is in a range of from 6% to 12% of a length in a width direction of the end surface of the element body.

13. The inductor according to claim 3, wherein
a base of the outer electrode connection portion is opposite to a tip of the outer electrode connection portion,
an end surface of the element body has a center and a width direction extending from the center to a side surface of the element body, and
a position of the base is configured such that, in the width direction, a distance from the base to the center in the width direction is less than 50% of a distance from the center to the side surface.

14. The inductor according to claim 4, wherein
a tip of the outer electrode connection portion is configured such that a length between an end surface of the element body on a side surface side and the tip of the outer electrode connection portion is in a range of from 6% to 12% of a length in a width direction of the end surface of the element body.

15. The inductor according to claim 4, wherein
a base of the outer electrode connection portion is opposite to a tip of the outer electrode connection portion,
an end surface of the element body has a center and a width direction extending from the center to a side surface of the element body, and
a position of the base is configured such that, in the width direction, a distance from the base to the center in the width direction is less than 50% of a distance from the center to the side surface.

* * * * *